(12) United States Patent
Kato

(10) Patent No.: US 7,933,261 B2
(45) Date of Patent: Apr. 26, 2011

(54) COMMUNICATION METHOD, COMMUNICATION SYSTEM, COMMUNICATION DEVICE, AND PROGRAM USING MULTIPLE COMMUNICATION MODES

(75) Inventor: Masafumi Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1372 days.

(21) Appl. No.: 11/419,590

(22) Filed: May 22, 2006

(65) Prior Publication Data

US 2006/0268839 A1 Nov. 30, 2006

(30) Foreign Application Priority Data

May 26, 2005 (JP) ................. 2005-153335

(51) Int. Cl.
*H04L 12/66* (2006.01)
*G08C 15/00* (2006.01)
*G06F 11/00* (2006.01)
*H04J 3/22* (2006.01)
*G06F 15/16* (2006.01)

(52) U.S. Cl. ........ 370/352; 370/229; 370/230; 370/231; 370/232; 370/233; 370/234; 370/353; 370/354; 370/355; 370/356; 370/464; 370/465; 370/466; 370/467; 370/468; 370/469; 709/227; 709/228; 709/229

(58) Field of Classification Search .......... 370/352–356, 370/229–234, 464–469; 709/227–229
See application file for complete search history.

(56) References Cited

U.S. PATENT DOCUMENTS

| | | | | |
|---|---|---|---|---|
| 6,011,978 A * | 1/2000 | Ault et al. | ................. | 455/552.1 |
| 6,304,578 B1 * | 10/2001 | Fluss | ............................. | 370/413 |
| 7,394,761 B2 * | 7/2008 | Foster et al. | ................. | 370/227 |
| 7,558,578 B1 * | 7/2009 | De Beer | ........................ | 455/445 |
| 7,729,355 B2 * | 6/2010 | Costa Requena et al. | .... | 370/352 |
| 2004/0133668 A1 * | 7/2004 | Nicholas, III | ................. | 709/223 |
| 2006/0155864 A1 * | 7/2006 | Izumi | ............................. | 709/230 |
| 2007/0189266 A1 * | 8/2007 | Izumi et al. | ................... | 370/352 |

FOREIGN PATENT DOCUMENTS

| | | |
|---|---|---|
| JP | 2004-147128 | 5/2004 |
| JP | 2004-214948 | 7/2004 |
| JP | 2005-051445 | 2/2005 |
| JP | 2005-080025 | 3/2005 |

* cited by examiner

*Primary Examiner* — Nathan Flynn
*Assistant Examiner* — Kai J Chang
(74) *Attorney, Agent, or Firm* — Oblon, Spivak, McClelland, Maier & Neustadt, L.L.P.

(57) ABSTRACT

In a communication method for performing data communication between communication devices via a network according to a predetermined mode, an attempt to establish the data communication according to a first communication mode is made. When the attempt has failed, another attempt to establish the data communication according to a second communication mode is made.

18 Claims, 21 Drawing Sheets

FIG. 4

<(SIP) INVITE(A)>

INVITE sip:T2@sip.sony.com;user=data
   Via: SIP/2.0/UDP 1.2.3.4:5060 branch=z9hG4bK123
   Max-Forwards: 70
   From: sip:T1@sip.sony.com
   To: sip:T2@sip.sony.com
   Call-ID: 12345
   CSeq: 1 INVITE
   Contact: sip:T1@1.2.3.4:5060
   Content-Type: image/jpeg
   Content-Length: xxx

[JPEG Data]

FIG. 6A

<(SIP) INVITE(A)>

INVITE sip:T2@sip.sony.com;user=data
Via: SIP/2.0/UDP 1.2.3.4:5060 branch=z9hG4bK123 ······ *1
Max-Forwards: 70
From: sip:T1@sip.sony.com
To: sip:T2@sip.sony.com
Call-ID: 12345
CSeq: 1 INVITE
Contact: sip:T1@1.2.3.4:5060 ······ *2
Content-Type: message/external-body;
   ACCESS-TYPE=URL;
   URL="http://1.2.3.4/someimage.jpeg ······ *3

FIG. 6B

<(HTTP) GET(B)>

GET http://1.2.3.4/someimage.jpeg HTTP/1.0
Host: 1.2.3.4

FIG. 6C

<(HTTP) 200 OK (C)[Data]>

HTTP/1.1 200 OK
Content-Type: image/jpeg
Content-Length: xxx

[JPEG Data]

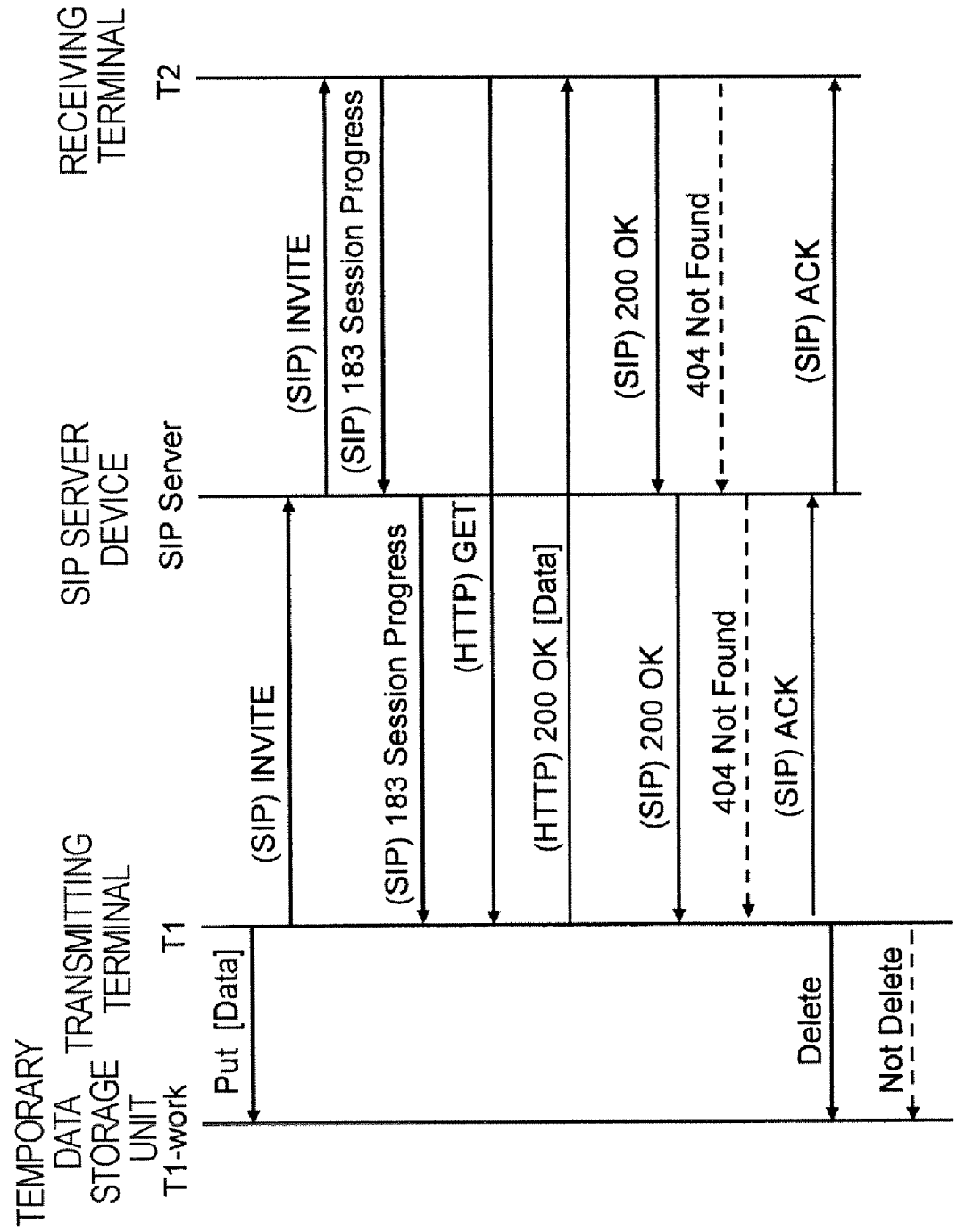

FIG. 10A

<(UPnP) Get External IP Address(A)>

POST /UD/?5 HTTP/1.0
Content-Type: text/xml
SOAPACTION: "urn:schemas-upnp-org:
service: WANIPConnection 1#GetExternalIPAddress"
Content-Length: xx
Host: 1.2.3.100:5678

<s:Envelope xmlns:s="http://schemas.xmlsoap.org/soap/envelope/"
  s:encodingStyle="http://schemas.xmlsoap.org/soap/encoding">
  <s:Body>
    <u:GetExternalIPAddress xmlns:u="urn:schemas-upnp-org:
      service:WANIPConnection:1"/>
  </s:Body>
</s:Envelope>

FIG. 10B

<(UPnP) Get External IP Address Response(B)>

HTTP/1.1 200 OK
Content-Type: text/xml
Content-Length: xxx

<s:Envelope xmlns:s="http://schemas.xmlsoap.org/soap/envelope/"
  s:encodingStyle="http://schemas.xmlsoap.org/soap/encoding/">
  <s:Body>
    <u:GetExternalIPAddressResponse xmlns:u="urn:schemas-upnp-org:
      service=WANIPConnection:1">
      <NewExternalIPAddress>10.20.30.40</NewExternalIPAddress> ··· *
    </u:GetExternalIPAddressResponse>
  </s:Body>
</s:Encoding>

FIG. 11A

<(UPnP) Add Port Mapping(C)>
POST /UD/?5 HTTP/1.0
Content-Type: text/xml
SOAPACTION: "urn:schemas-upnp-org:
service: WANIPConnection 1#AddPortMapping"
Content-Length: xx
Host: 1.2.3.100:5678

<s:Envelope xmlns:s="http://schemas.xmlsoap.org/soap/envelope/"
  s:encodingStyle="http://schemas.xmlsoap.org/soap/encoding">
  <s:Body>
    <u:AddPortMaping xmlns:u="urn:schemas-upnp-org:
      service:WANIPConnection:1">
     <NewRemoteHost></NewRemoteHost>
     <NewExternalPort>10080</NewExternalPort>
     <NewProtocol>TCP</NewProtocol>    ······*
     <NewInternalPort>80</NewInternalPort>
     <NewInternalClient>1.2.3.4</NewInternalClient>
     <NewEnabled>1</NewEnabled>
     <NewLeaseDuration>0</NewLeaseDuration>
    </u:AddPortMapping>
  </s:Body>
</s:Envelope>

FIG. 11B

<(UPnP) Add Port Mapping Response(D)>
HTTP/1.1 200 OK
Content-Type: text/xml
Content-Length: xxx <s:Envelope xmlns:s="http://schemas.xmlsoap.org/soap/envelope/"
  s:encodingStyle="http://schemas.xmlsoap.org/soap/encoding/">
  <s:Body>
    <u:AddPortMappingResponse xmlns:u="urn:schemas-upnp-org:
      service=WANIPConnection:1">
    </u:AddPortMappingResponse>
  </s:Body>
</s:Encoding>

FIG. 12A

<(SIP) INVITE(E)>

INVITE sip:T2@sip.sony.com;user=data
Via: SIP/2.0/UDP 10.20.30.40:15060  branch=z9hG4bK123 ······ *1
Max-Forwards: 70
From: sip:T1@sip.sony.com
To: sip:T2@sip.sony.com
Call-ID: 12345
CSeq: 1 INVITE
Contact: sip:T1@10.20.30.40:15060 ······ *2
Content-Type: message/external-body;
   ACCESS-TYPE=URL;
    URL="http://10.20.30.40:10080/someimage.jpeg ······ *3

FIG. 12B

<(HTTP) GET(F)>

GET http://10.20.30.40:10080/someimage.jpeg HTTP/1.0
Host: 10.20.30.40:10080

FIG. 12C

<(HTTP) 200 OK(G) [Data]>

HTTP/1.1 200 OK
Content-Type: image/jpeg
Content-Length: xxx

[JPEG Data]

FIG. 17A

<(SIP) INVITE(A)>

INVITE sip:T2@sip.sony.com;user=data
Via: SIP/2.0/UDP 10.20.30.40:15060  branch=z9hG4bK123 ······ *1
Max-Forwards: 70
From: sip:T1@sip.sony.com
To: sip:T2@sip.sony.com
Call-ID: 12345
CSeq: 1 INVITE
Contact: sip:T1@10.20.30.40:15060 ······ *2
Content-Type: message/external-body;
    ACCESS-TYPE=URL;
    URL="http://10.20.30.100/tmp/T1/someimage.jpeg ······ *3

FIG. 17B

<(HTTP) GET(B)>

GET http://10.20.30.100/tmp/T1/someimage.jpeg HTTP/1.0
Host: 10.20.30.100

FIG. 17C

<(HTTP) 200 OK (C)[Data]>

HTTP/1.1 200 OK
Content-Type: image/jpeg
Content-Length: xxx

[JPEG Data]

COMMUNICATION METHOD, COMMUNICATION SYSTEM, COMMUNICATION DEVICE, AND PROGRAM USING MULTIPLE COMMUNICATION MODES

CROSS REFERENCES TO RELATED APPLICATIONS

The present invention contains subject matter related to Japanese Patent Application JP 2005-153335 filed in the Japanese Patent Office on May 26, 2005, the entire contents of which are incorporated herein by reference.

BACKGROUND OF THE INVENTION

1. Field of the Invention

The present invention relates to a communication method, a communication system and communication device for performing the communication method, and a program for controlling the communication device.

2. Description of the Related Art

There are various types of networks for enabling communication between a plurality of terminals. Networks using Internet protocol (IP) as a transmission protocol (hereinafter referred to as "IP networks") are well known.

In IP networks, mechanisms that provide media communication, such as audio and video communication, between terminals, e.g., IP telephony and videoconferencing systems, have been developed. Recently, the establishment of enterprise networks has attracted attention.

In media communication, such as audio and video communication, for example, terminals connected to an IP network perform call control operations, such as setup, modification, teardown, and completion response of a media communication session. Session initiation protocol (SIP) has attracted attention as a session control protocol. SIP is an application layer protocol for realizing, for example, telephone call setup on an IP network, and is standardized by the Internet Engineering Task Force (IETF). SIP is used for transmission or reception of IP address information necessary for setting up a session in the application layer or real-time transport protocol (RTP) IP address information to be used by transmitting and receiving terminals. RTP is a real-time data transfer protocol for use in communication services, such as Voice over IP (VoIP) services for transmitting audio via IP packets or video transmission services, and is standardized by the IETF.

Recently, SIP, which is a call control protocol, has been widely used, mainly, in VoIP (Internet telephony) services, and service infrastructures centered on SIP servers have been established. At present, instant messaging (IM) services are often implemented using SIP. However, SIP does not support actual data transfer (also referred to as "file transfer"), such as transfer of audio files or image files, between terminals. Some methods for enabling file transfer by using a combination of standard protocols and original protocols, other than SIP, have been proposed (see Japanese Unexamined Patent Application Publication No. 2004-147128 and No. 2005-051445).

SUMMARY OF THE INVENTION

However, due to the use of SIP messages, which are not used in general VoIP call control, typical methods, such as the methods disclosed in the publications noted above, have experienced a problem that communication may be interrupted before the completion of transfer of data depending on the type of the SIP server or that the SIP messages may not pass through network address translation (NAT) or firewall systems. No standard methods exist for providing reliable communication regardless of the environment.

Although immediate responses may be needed in SIP call control, the time required for transferring (transmitting and receiving) actual data depends on the amount of data and some amount may therefore be required. If a SIP message to which data is directly attached is transmitted to a receiver, the transfer of the actual data may not be completed within a required period of call control response time.

Generally, SIP terminals open data channels for bi-directional data transfer, one channel for each, to perform communication between the terminals. Further, a call connection is performed to open the data channels. Thus, one call connection channel and two data channels are opened. A call connection channel is generally assigned a known port while a data channel is assigned a port dynamically determined in the call control procedure. In communication over a firewall or communication performed by a network communication device via a NAT system, there arises a problem in that inbound and outbound traffic on the determined port of the data channel may not pass through the firewall or NAT system and the communication may not be possible.

It is therefore desirable to provide a mechanism that enables reliable data communication without being affected by the amount of data or the network environment.

According to an embodiment of the present invention, a communication device includes a call control processor that performs call control, a data transfer processor that performs data transfer, and a control unit that controls an operation associated with communication. The data transfer processor serves as a data transmitting processor in a transmission-side communication device, and serves as a data receiving processor in a reception-side communication device. The call control processor preferably performs call control according to SIP.

In data communication, the transmission-side communication device and the reception-side communication device perform the call control function and the communication function for data transfer according to separate protocols. By combining these protocols, data transfer is implemented directly or via data storage means (which may be an external data storage unit or an internal data storage unit).

The control unit attempts to establish data communication according to one of a plurality of communication modes. When the attempt has failed, the control unit attempts to establish the data communication according to another communication mode.

Some of the plurality of communication modes are attempted, and a communication mode suitable for the actual environment is determined without being affected by the amount of data or the network environment. According to the determined communication mode, data transfer is carried out between terminals directly or via data storage means.

The dependent claims define further advantageous specific examples of the present invention.

According to an embodiment of the present invention, there is provided a program for performing the communication processing of the embodiment of the present invention in software using an electronic calculator (computer). The program may be distributed via a computer-readable storage medium or may be distributed via wired or wireless communication means.

Preferably, the communication modes may be attempted in order from the lowest level of the amount of data and/or communication processing to the highest level. For example, preferably, the communication modes may be attempted in order from a low-level communication mode that handles a smaller amount of transmission data, e.g., smaller message size or smaller file data size, to a high-level communication mode that handles a larger amount of transmission data. With regard to the level of communication processing control, preferably, the communication modes may be attempted in order from a low-level communication mode that requires fewer processing steps and less complicated processing control to a high-level communication mode that requires more processing steps and more complicated processing control. Many attempts of the communication modes in order from the low level to the high level provide efficient data transfer using a communication mode suitable for the current environment.

By providing data storage means for storing transmission data, transmission data is stored in a data storage unit instead of attaching the data directly to a data transmission request notification at the time of the transmission of the data. The call control processor of the transmission-side communication device notifies the reception-side communication device of a publicly accessible address corresponding to the data stored in the data storage unit, which is available to the reception-side communication device. Upon receipt of the notification, the reception-side communication device accesses the publicly accessible address to obtain the data released from the transmission-side communication device regardless of the time at which a reception completion response notification is issued in response to a data transmission request from the transmission-side communication device.

The data storage means may be included in the transmission-side communication device or may be provided outside the transmission-side communication device. In a system having blocking means for blocking external access to the transmission-side communication device, such as NAT or firewall, the call control processor of the transmission-side communication device may obtain an address available to the reception-side communication device corresponding to transmission data from the blocking means such as NAT, and may notify the reception-side communication device of the obtained address.

In a case where the transmission-side communication device is not provided with the function of obtaining an address available to the reception-side communication device corresponding to transmission data from the blocking means such as NAT, external data storage means provided outside the blocking means with respect to the transmission-side communication device may be used. In this case, also, the call control controller of the transmission-side communication device may obtain an address available to the reception-side communication device corresponding to transmission data from the blocking means such as NAT, and may notify the reception-side communication device of the obtained address.

Accordingly, an externally accessible address corresponding to transmission data is sent to a receiver, and the receiver accesses the sent address. Even in communication over a firewall or communication performed by a communication device via a NAT system, appropriate data transfer is performed.

Preferably, the receiver sends a completion notification to a transmitter at the time of the completion of the reception of the data, and the transmitter deletes data stored in storage means upon receiving the completion notification.

According to an embodiment of the present invention, in data communication between a transmission-side communication device and a reception-side communication device by implementing the call control function and the communication function for data transfer using a combination of separate protocols, an attempt to establish data communication according to one of a plurality of communication modes is made. When the attempt has failed, another attempt to establish the data communication according to another communication mode is made. Thus, reliable data communication is achieved without being affected by the amount of data or the network environment.

BRIEF DESCRIPTION OF THE DRAWINGS

FIG. 4 is a diagram showing an example of a request message used in the first communication mode;

FIGS. 6A to 6C are diagrams showing examples of messages used in the basic procedure of the second communication mode;

FIG. 7 is a sequence diagram showing an improved procedure of the second communication mode;

FIGS. 10A and 10B are diagrams showing examples of messages used in the basic procedure of the third communication mode;

FIGS. 11A and 11B are diagrams showing examples of the messages used in the basic procedure of the third communication mode;

FIGS. 12A to 12C are diagrams showing examples of the messages used in the basic procedure of the third communication mode;

FIGS. 17A to 17C are diagrams showing examples of messages used in the basic procedure of the fourth communication mode;

DESCRIPTION OF THE PREFERRED EMBODIMENTS

An embodiment of the present invention will be described in detail with reference to the drawings.

First, the outline of various communication modes to be used in the embodiment will be discussed. Then, a process for selecting one of the communication modes suitable for a given situation will be discussed.

System Configuration Implementing First and Second Modes

Figure 1:
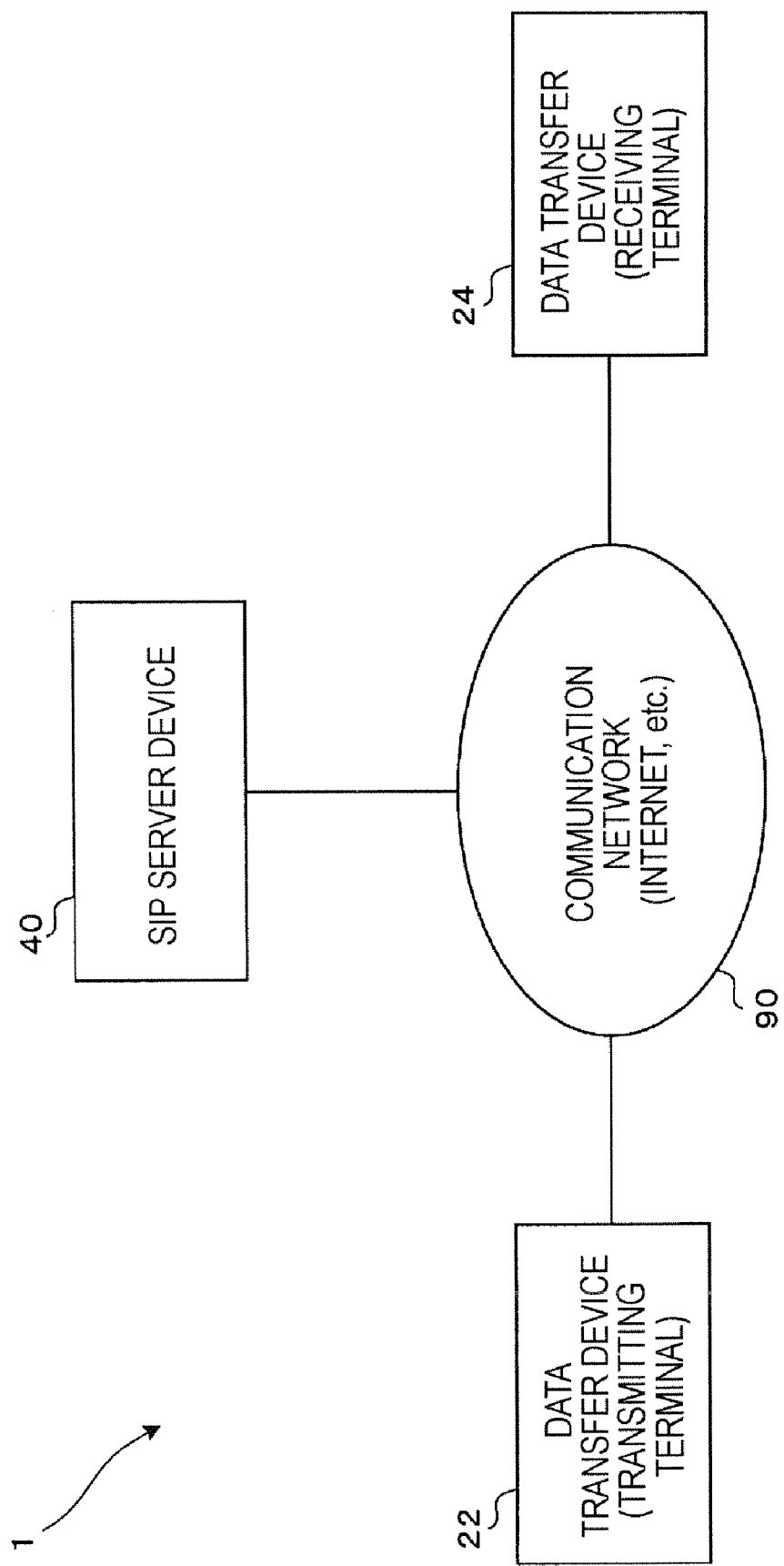
FIG. 1 is a diagram showing an example network system configuration of a network system implementing a first communication mode and a second communication mode.

FIG. 1 illustrates an example network system configuration of a network system 1 implementing a first communication mode and a second communication mode (hereinafter also referred to as "first/second modes"). As shown in FIG. 1, in the network system 1 for the first/second modes, a transmitting terminal 22 serving as a transmission-side data transfer device, a receiving terminal 24 serving as a reception-side data transfer device, and a session initiation protocol (SIP) server device 40 having a world wide web (WWW) server (hypertext transfer protocol (HTTP) server) or file transfer protocol (FTP) server function are interconnected to a communication network 90, such as the Internet.

The SIP server device 40 is an SIP proxy server having a "proxy" function, and acts as a proxy for performing call control operations, such as setup, modification, teardown, completion response of a data communication session, between the terminals connected to the communication network 90.

The receiving terminal 24 has a WWW communication function for performing operations, such as browsing data of a WWW server using an HTTP data transmission/reception protocol, jumping to another link, recording and outputting, and transferring. The transmitting terminal 22 and the receiving terminal 24 are collectively referred to as a "data communication device 20". In FIG. 1, data transmission from the transmitting terminal 22 to the receiving terminal 24 is illustrated; however, the network system 1 may provide bi-directional communication depending on the application, in which case each data communication device 20 includes the abilities of the transmitting terminal 22 and the receiving terminal 24.

The data communication device 20 may be implemented by, for example, an image communication device for use in a videoconferencing system, or may be implemented by any other typical information communication device suitable for communication using the Internet or the like, such as a communication device for IP telephony.

The data communication devices 20 (the transmitting terminal 22 and the receiving terminal 24) and the SIP server device 40 include function units for implementing a communication function using an access method such as CSMA/CD (Carrier Sense Multiple Access with Collision Detection), and are assigned private IP addresses for identifying them.

In the network system 1, the data communication devices 20 (the transmitting terminal 22 and the receiving terminal 24) use SIP to perform call control via the SIP server device 40, and certain data is transferred from the transmitting terminal 22 to the receiving terminal 24. Thus, arbitrary data files, such as audio files and image files, are transferred between terminals capable of establishing a call connection on the SIP service infrastructure (in this example, the transmitting terminal 22 and the receiving terminal 24).

This mechanism may be implemented by function units of the data communication device 20 having functions, such as an Internet telephone (Voice over IP (VoIP)) function, an Internet video telephone function, a videoconferencing system function, and an instant messaging (IM) function, or may be implemented by integrating the mechanism into application software installed in the function units.

In the network system 1, therefore, the transmission-side data communication device 20 (the transmitting terminal 22) issues a request for data communication to the reception-side data communication device 20 (the receiving terminal 24) via the SIP server device 40, and the reception-side data communication device 20 (the receiving terminal 24) sends a response to the transmitting terminal 22 via the SIP server device 40 in response to the request for the data communication. In the network system 1, communication of actual data (data transfer) is performed directly between the transmitting terminal 22 and the receiving terminal 24 without the intervention of the SIP server device 40.

Example Structure of Data Communication Device

Figure 2:
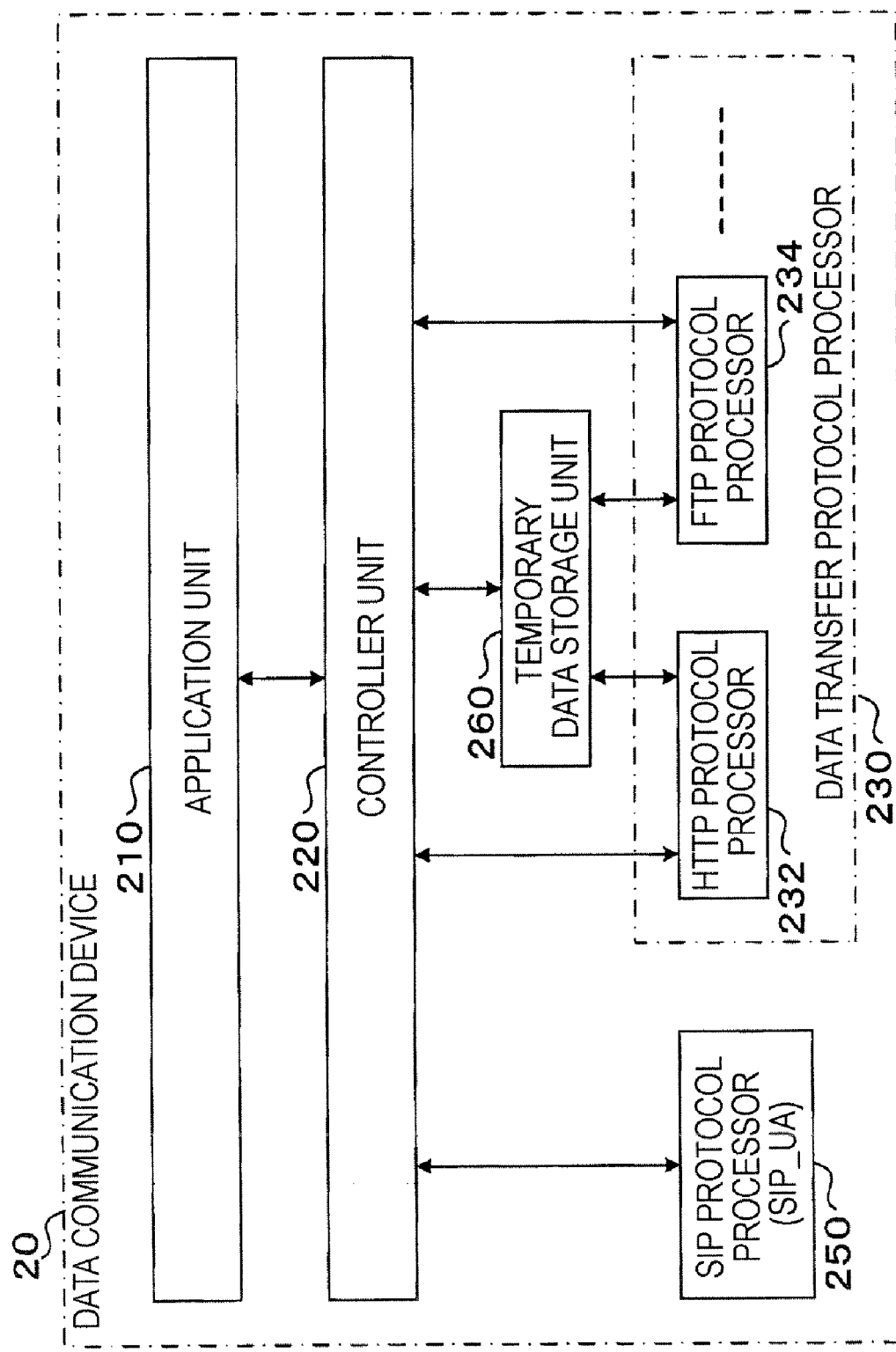
FIG. 2 is a block diagram showing an example structure of a data communication device.

FIG. 2 is a block diagram showing an example structure of the data communication device 20. As shown in FIG. 2, the data communication device 20 includes an application unit 210 that performs processing, such as image processing and communication processing, a controller unit 220 that controls the respective components of the data communication device 20, a data transfer protocol processor 230 having various protocol processors, such as an HTTP protocol processor 232 that performs communication for data transfer according to the HTTP protocol and an FTP protocol processor 234 that performs communication for data transfer according to the FTP protocol, a SIP protocol processor (SIP_UA) 250 that performs communication for data transfer (namely, call control) according to the SIP protocol, and a temporary data storage unit 260 serving as data storage means for temporarily storing the data to be transmitted by the data transfer protocol processor 230. That is, the transmitting terminal 22 includes a data storage unit, which is an example of data storage means for temporarily storing transmission data.

The application unit 210 is connected to the controller unit 220, and has functions of finding a partner device for the data transfer and implementing the data transfer. The controller unit 220 has at least a function of controlling an operation associated with communication, and controls the application unit 210, the data transfer protocol processor 230, the SIP protocol processor 250, and the temporary data storage unit 260, as needed.

The data transfer protocol processor 230 is an example of a data transfer processor that performs communication of actual data (data transfer). The data transfer protocol processor 230 serves as a data transmitting processor in the transmitting terminal 22, and serves as a data receiving processor in the receiving terminal 24. The SIP protocol processor 250 is an example of a call control processor, and uses SIP and session description protocol (SDP), which is specified in RFC2327, to perform call control operations, such as setup, modification, teardown, reception completion response notification of a data communication session, between the terminals connected to the communication network 90.

The temporary data storage unit 260 is internally connected to the HTTP protocol processor 232 and the FTP protocol processor 234 of the data transfer protocol processor 230, and is used as an area for processing transmission data and received data. The temporary data storage unit 260 serves as internal data storage means of the data communication device 20. The temporary data storage unit 260 is not used to implement the first communication mode.

First Communication Mode

Figure 3:
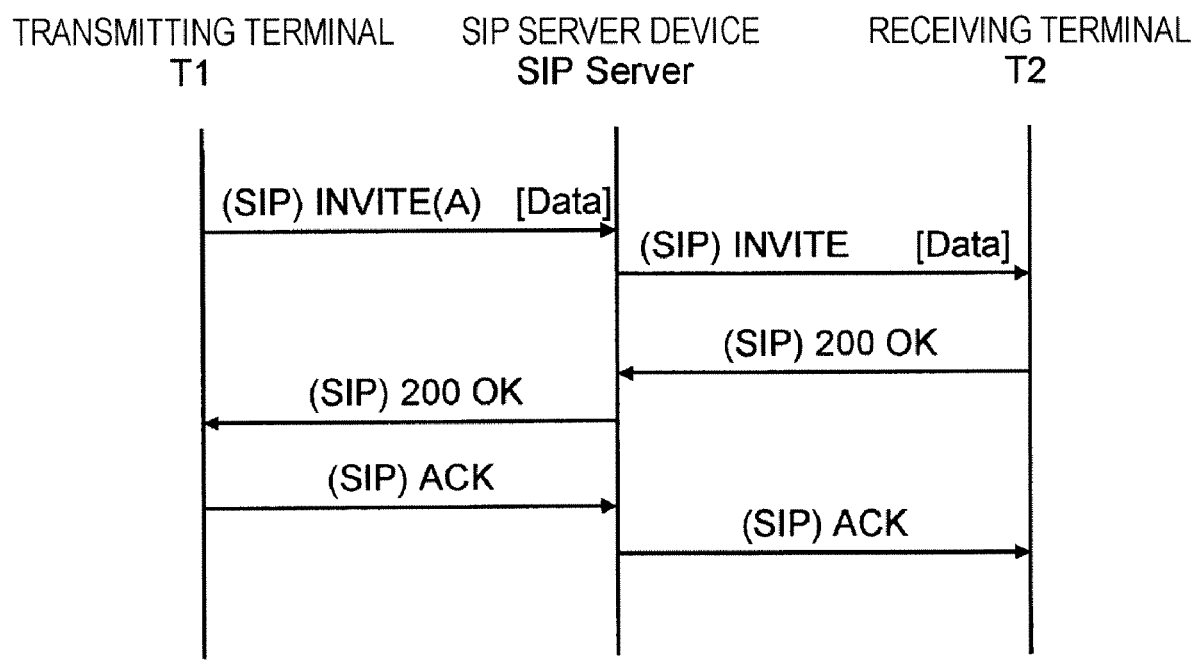
FIG. 3 is a sequence diagram showing a procedure of the first communication mode in the network system shown in FIG. 1.

FIG. 3 is a sequence diagram showing a procedure of the first communication mode in the network system 1 shown in FIG. 1. FIG. 4 illustrates an example of a request message (data transmission request notification) used in the first communication mode. Parameter "user=data" is added to a request URI (Uniform Resource Identifier) to indicate that a SIP request message is used for the data transfer. The same applies to the following communication modes.

The first communication mode is suitable for cases where no network address translation (NAT) device or firewall (FW) device for blocking a request from the outside is provided between the transmitting terminal 22 and the receiving terminal 24, where the transmission-side data communication device 20 (the transmitting terminal 22 with global IP="1.2.3.4") is rendered externally accessible, and where a small amount of data is handled. The procedure of the first communication mode is basically the same as that illustrated in FIG. 1 of Japanese Unexamined Patent Application Publication No. 2005-051445.

First, the transmitting terminal 22 (T1) is rendered accessible by using a standard protocol for data transfer, such as FTP, and writes call control signals (an INVITE signal and other signals) in a transmission message. Necessary information, such as the address of the transmitting terminal, the address of the receiving terminal, and the address of the server, is written in a SIP request message such as an INVITE-method or MESSAGE-method request message.

The transmitting terminal 22 directly adds data to be transferred to the body of the SIP request message, which is a feature of the first communication mode, and transmits the SIP request message to the SIP server device 40 (SIP Server). In FIG. 4, the INVITE method is employed, and JPEG image data is added to the INVITE request message.

Upon receipt of the INVITE request message, the SIP server device 40 forwards a necessary part of the INVITE request message to the receiving terminal 24 (T2), which is designated as the data transfer destination in the "INVITE sip" header of the INVITE request message. In response to the transferred INVITE request message, the receiving terminal 24 returns a "200 OK" response message, which is a response indicating successful reception, to the transmitting terminal 22 via the SIP server device 40. Upon receipt of the "200 OK" response message, the transmitting terminal 22 returns an "ACK" response message, which is a response indicating acknowledgement, to the receiving terminal 24 via the SIP server device 40.

In the first communication mode, as shown in FIG. 4, the type of the added data (in FIG. 4, "image/jpeg") is contained in the "Content-Type" header of the INVITE request message (A), and the size of the added data (in FIG. 4, "xxx") is contained in the "Content-Length" header.

In the first communication mode, therefore, transmission data is attached to a data transmission request notification to be sent from a transmitter to a receiver. The first communication mode, which is less sophisticated than the following second through fourth communication modes, provides reliable data communication without complicated processing in a case where a small amount of data is handled so that the session can be completed within a period of response time.

In SIP call control, however, as is apparent from FIG. 3, since the response is immediately issued, a reception completion response notification may be issued before the completion of the transfer (transmission and reception) if the amount of actual data is large. The main reason is the limited size of messages due to the SIP protocol specification. The first communication mode is a communication mode lower in level of the amount of transmission data than the second communication mode and the others, discussed below.

In many cases, existing SIP servers (that is, the SIP server device 40 of the present embodiment) block SIP messages of large size. If the communication session is terminated when the transmitting terminal 22 receives a reception completion response notification from the receiving terminal 24, the transfer of the actual data may not be completed successfully. This problem is solved by using the following second communication mode or the like, which is higher in level of the amount of transmission data and which can handle a larger amount of data.

Second Communication Mode

Figure 5:
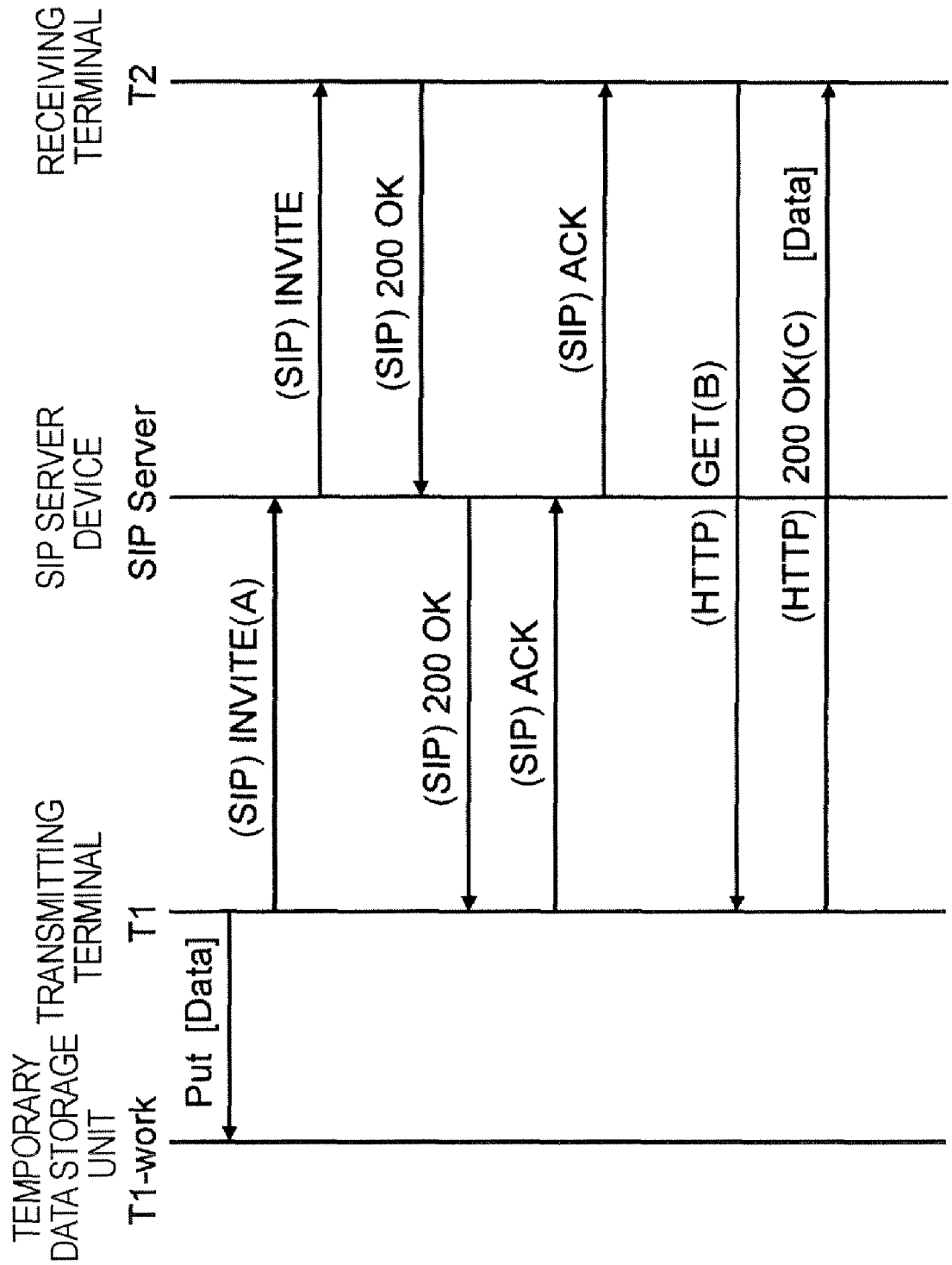
FIG. 5 is a sequence diagram showing a basic procedure of the second communication mode in the network system shown in FIG. 1.

FIG. 5 is a sequence diagram showing a basic procedure of the second communication mode in the network system 1 shown in FIG. 1. FIGS. 6A, 6B, and 6C illustrate examples of messages used in the basic procedure of the second communication mode, that is, a request message (A), a GET message (B), and a response message (C) at the time of transmission of data, respectively. FIG. 7 is a sequence diagram showing an improved procedure of the second communication mode.

The second communication mode is common to the first communication mode in that no NAT device or firewall device exists between the transmitting terminal 22 and the receiving terminal 24 for blocking a request from the outside. The second communication mode is suitable for a case where the amount of data is larger than a predetermined value, and has features that the transmission-side data communication device 20 stores transmission data in the temporary data storage unit 260 and writes an HTTP or FTP URL (Uniform Resource Locators) available to the public, which is obtained from the data transfer protocol processor 230, in a SIP INVITE request message, and that the reception-side data communication device 20 accesses the URL to obtain the data via HTTP or FTP. The procedure of the second communication mode is basically the same as that illustrated in FIG. 4 of Japanese Unexamined Patent Application Publication No. 2004-147128.

In the basic procedure shown in FIG. 5, first, the transmitting terminal 22 (T1) stores transmission data in the temporary data storage unit 260 (T1-work) (in FIG. 5, "Put [Data]"). Then, the transmitting terminal 22 (T1) is rendered accessible by using a standard protocol for data transfer, such as HTTP, and writes necessary information, such as addresses and paths, in a SIP request message such as an INVITE-method or MESSAGE-method request message. The transmitting terminal 22 further writes an address accessible from the receiving terminal 24, such as an HTTP URL, corresponding to transmission data in the SIP INVITE request message, which is a feature of the second communication mode, and sends a data transmission request to the receiving terminal 24 via the SIP server device 40 (SIP Server).

The transmitting terminal 22 stores transmission data in the temporary data storage unit 260, and obtains a publicly accessible URL from the data transfer protocol processor 230 (the HTTP protocol processor 232 or the FTP protocol processor 234). As shown in FIG. 6A, the URL is contained in the "Content-Type" header of the INVITE request message (A). In this example, the URL is "http://1.2.3.4/someimage.jpeg" (see the line with "*3" in FIG. 6A).

As shown in FIG. 6A, the type of the added data (in FIG. 6A, "message/external-body;") is contained in the "Content-Type" header of the INVITE request message (A), and the type of access (in FIG. 6A, "URL") is contained in the "ACCESS-TYPE" header.

Upon receipt of the INVITE request message, the SIP server device 40 forwards a necessary part of the INVITE request message to the receiving terminal 24 (T2), which is designated as the data transfer destination in the "INVITE sip" header of the INVITE request message. In response to the forwarded INVITE request message, the receiving terminal 24 returns a "200 OK" response message, which is a response indicating successful reception, to the transmitting terminal 22 via the SIP server device 40. Upon receipt of the "200 OK" response message, the transmitting terminal 22 returns an "ACK" response message, which is a response indicating acknowledgement, to the receiving terminal 24 via the SIP server device 40.

Upon receipt of the "ACK" response message, the receiving terminal 24 uses the WWW communication function to receive the communication data from the transmission-side data communication device 20 based on the type of the data transfer protocol or address information contained in the "Content-Type" header of the INVITE request. For example, the receiving terminal 24 sends the GET message (B) shown in FIG. 6B to the transmitting terminal 22, and makes an attempt to obtain the data. In this example, "http://1.2.3.4/someimage.jpeg HTTP/1.0" is sent to the transmitting terminal 22. In response to the GET message (B), the transmitting terminal 22 transmits a "200 OK" response message (C) with data, shown in FIG. 6C, to the receiving terminal 24.

In the second communication mode, therefore, data communication is performed between the transmitting terminal 22 and the receiving terminal 24 by implementing the call control function and the communication function for data transfer using a combination of separate protocols. Thus, whenever the receiving terminal 24 sends a reception completion response notification in response to a data transmission request from the transmitting terminal 22, it ensures that the data stored in the data storage unit is transferred to the receiver. This is because, even if SIP protocol processor 250 of the receiving terminal 24 issues a reception completion response notification before the completion of the transfer of the actual data and the SIP protocol processor 250 of the transmitting terminal 22 receives the reception completion response notification, the session of data transfer continues between the data transfer protocol processors 230 of both devices.

Improved Procedure of Second Communication Mode

In the basic procedure of the second communication mode, transmission data is stored in the temporary data storage unit 260 in the initial stage of the data transmission procedure. However, it is difficult for the transmitting terminal 22 to properly and efficiently determine whether or not to delete the temporarily stored transmission data (an example of the temporary data).

For example, it is conceivable to delete the data upon reception of a reception completion response notification from the receiving terminal 24. In SIP call control, as is apparent from FIG. 5, since the response is immediately issued, the data would have been deleted before the transfer (transmission and reception) of the actual data, which is not useful. Further, due to the limited capacity of the temporary data storage unit 260, if data is continuously stored, the second communication mode is not implemented when the capacity limit has been reached. It is conceivable to sequentially delete older data after the capacity limited has been reached, in which case it is difficult to determine whether or not to delete them.

In this embodiment, the problem involved with the second communication mode is solved by a mechanism discussed below. In order to solve the problem, a processing result of the data transfer using a data transfer protocol, such as HTTP, is sent to the transmitting terminal 22, which is the transmission-side data communication device 20. Due to the connectivity to the SIP server device 40, the network traffic, etc., desirably, the processing result is sent by means of a normal SIP response without extension. In many cases, a SIP request may need an immediate response due to the protocol specification, and, if no response is returned within a certain period of time (t0), it is determined that the request has failed. In most cases, however, it takes t0 or more time to transmit data via a data transfer protocol, such as HTTP.

This problem is solved by transmitting a provisional response from the receiving terminal 24 to the transmitting terminal 22. It is preferable that an INVITE request, which is a request that allows the transmission of a final response to be postponed, be used as a provisional response, thereby solving the problem discussed above.

In the second communication mode in which the actual data is transferred between the transmitting terminal 22 and the receiving terminal 24 using a data transfer protocol such as HTTP, as illustrated in the improved procedure shown in FIG. 7, the transmission-side data communication device 20 (the transmitting terminal 22, namely, T1) sends information, such as URL, to the reception-side data communication device 20 (the receiving terminal 24, namely, T2) via the SIP server device 40 by means of an INVITE request. In response to the transferred INVITE request message, the receiving terminal 24 transmits a provisional response, such as a "183 Session Progress" message, to the transmitting terminal 22 via the SIP server device 40, instead of immediately returning a "200 OK" response message, which is a reception completion response notification indicating the completion of the reception of the data, so that the transmission of the final response can be postponed.

The receiving terminal 24 obtains the data via a data transfer protocol, such as HTTP. Specifically, the receiving terminal 24 sends the GET message (B) shown in FIG. 6B to the transmitting terminal 22, and makes an attempt to obtain the data based on the type of the data transfer protocol or address information contained in the "Content-Type" header of the INVITE request. In response to the GET message (B), the transmitting terminal 22 transmits a "200 OK" response message with data, shown in FIG. 6C, to the receiving terminal 24.

At the time of the completion of the reception of the data, the receiving terminal 24 returns a "200 OK" response message, which is a response indicating the completion of the reception (herein, namely, a final response), to the transmitting terminal 22 via the SIP server device 40.

Upon receipt of the "200 OK" response message (the final response), the transmitting terminal 22 returns an "ACK" response message, which is a response indicating acknowledgement, to the receiving terminal 24 via the SIP server device 40. Upon receiving the "200 OK" response message (the final response), the temporary data storage unit 260 deletes the temporarily stored transmission data. Since the receiving terminal 24 has received the data, the temporary data storage unit 260 can safely and reliably delete the data.

As indicated by dotted lines in FIG. 7, when the receiving terminal 24 fails to obtain the data via a data transfer protocol, it transmits a failure response, such as a "404 Not Found" message, to the transmitting terminal 22 via the SIP server device 40. The transmitting terminal 22 that has received the failure response determines that the data transfer in accordance with the second communication mode has failed. In this case, the transmitting terminal 22 does not delete the temporarily stored transmission data from the temporary data storage unit 260, and makes another attempt to establish the communication according to the same second communication mode or a more sophisticated communication mode.

System Configuration Implementing Third Mode

Figure 8:
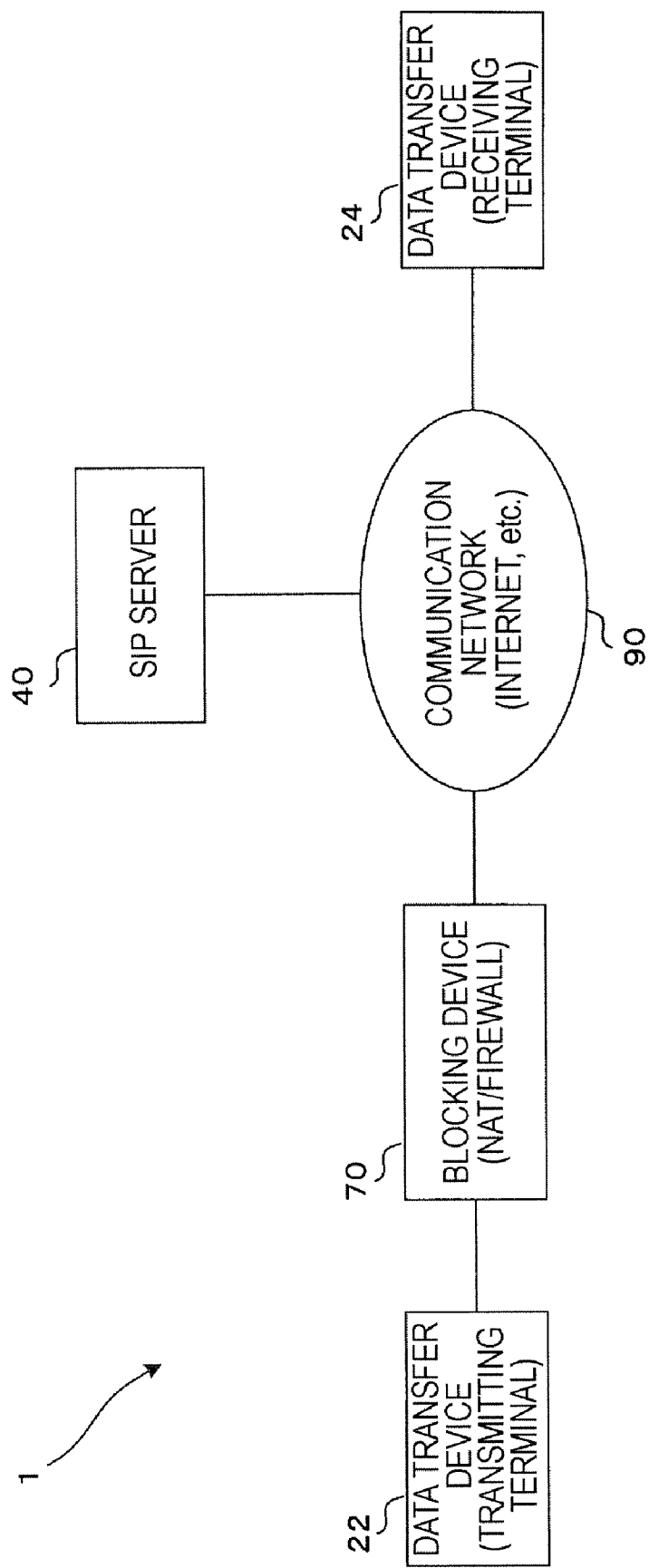
FIG. 8 is a diagram showing an example network system configuration of a network system implementing a third communication mode.

FIG. 8 illustrates an example network system configuration of a network system 1 implementing a third communication mode (hereinafter also referred to as a "third mode"). In the network system 1 for the third mode, the transmitting terminal 22 is provided behind blocking means for blocking external access, such as a NAT device or a firewall device, and no data transfer protocol connection from the receiving terminal 24 is established using the same mode as the second communication mode. The third communication mode is suitable for cases where the transmission-side data communication device 20 (the transmitting terminal 22) is rendered externally inaccessible and where means for controlling a NAT device or firewall implemented in accordance with a plug-and-play protocol, such as Universal Plug and Play (UPnP), is provided.

The third mode may require more processing steps and more complex processing control and is higher in level of the communication processing control than the second mode. However, due to the existence of a NAT device or a firewall, a session even in an environment, which is not handled by the second mode (which is lower in level of the communication processing control than the third mode), is handled by the third mode.

Specifically, as shown in FIG. 8, the network system 1 for the third mode has a feature over the network system 1 for the first/second modes in that a blocking device 70 for blocking external access, such as a network address translation (NAT) device or a firewall (FW) device, is provided between the data communication device 20 and the communication network 90.

The NAT device performs address translation to enable communication between a communication terminal having a private address available within a closed network, such as a local area network (LAN), and a communication terminal having a global address available within the Internet. In a LAN connected to the Internet, due to security reasons, IP addresses available only within a local environment, called a private Internet protocol (IP), are typically assigned. A terminal within a LAN accesses the Internet by translating the private IP address of the connection requesting terminal at a connection point to an external network into a global IP address available within the Internet. This operation is performed by NAT.

The FW device is located between the Internet and the LAN for managing inbound and outbound data communication traffic and protecting the internal network from external attack or unauthorized access. The FW device may be, for example, of the packet-filtering-router type in which packets are routed or blocked by a multi-home host (which is a device connected to a plurality of networks) according to rules, the proxy-server type in which kernel-based packet transfer is prohibited on a multi-home host while daemon-based authentication and packet transfer are performed, or a combination thereof.

Third Communication Mode

Figure 9:
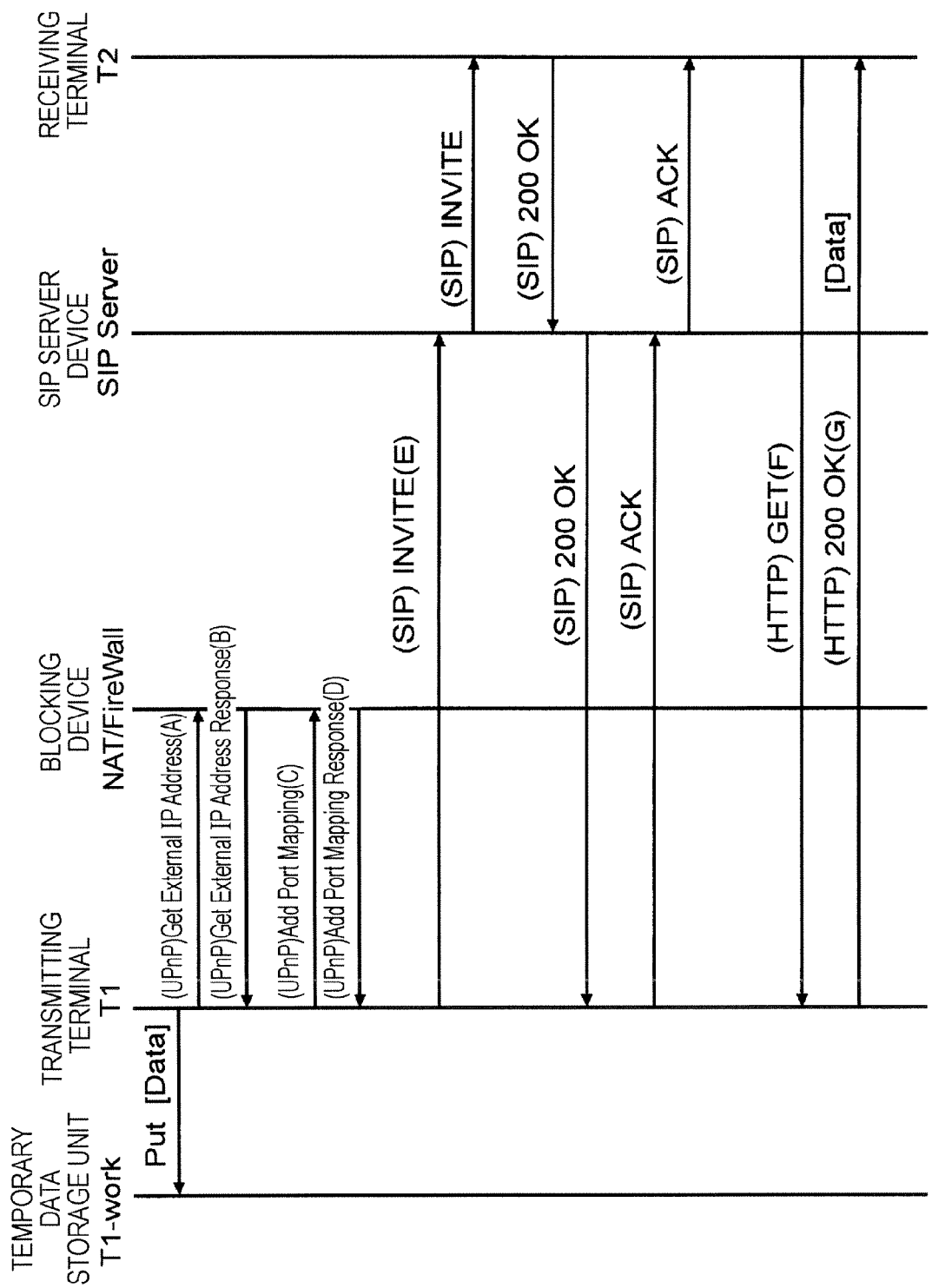
FIG. 9 is a sequence diagram showing a basic procedure of the third communication mode in the network system shown in FIG. 8.
Figure 13:
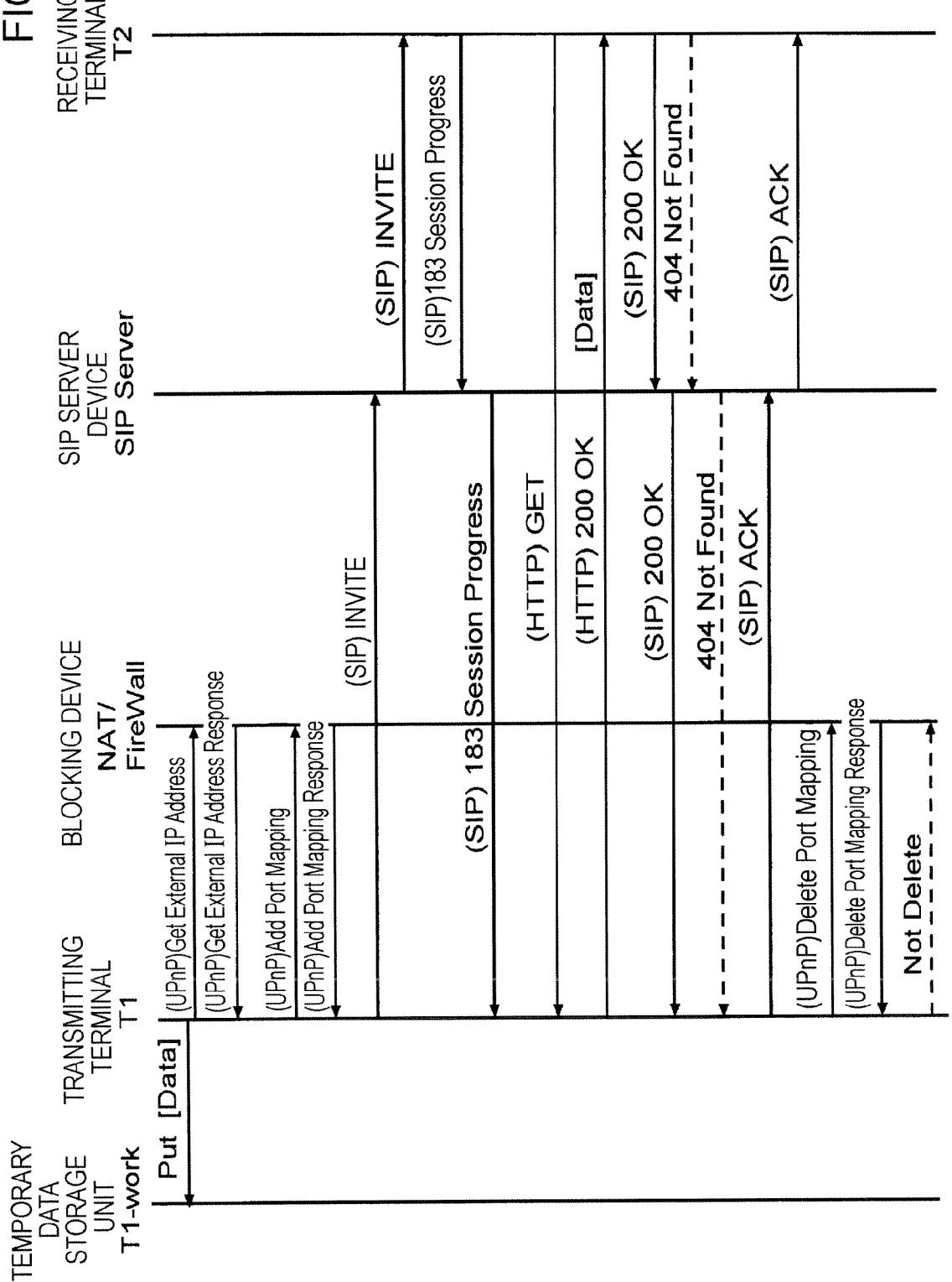
FIG. 13 is a sequence diagram showing an improved procedure of the third communication mode.

FIG. 9 is a sequence diagram showing a basic procedure of the third communication mode in the network system 1 shown in FIG. 8. FIGS. 10A to 12C illustrate examples of various messages used in the basic procedure of the third communication mode. FIG. 13 is a sequence diagram showing an improved procedure of the third communication mode.

The third communication mode is common to the second communication mode in that the transmission-side data communication device 20 (the transmitting terminal 22 with private IP "1.2.3.100") stores transmission data in the temporary data storage unit 260 and obtains a publicly accessible HTTP or FTP URL from the data transfer protocol processor 230. The third communication mode has features that the blocking device 70, such as a NAT device or a FW device, uses UPnP to generate and obtain an external address port corresponding to the URL and to write it in an INVITE request message and that the reception-side data communication device 20 (the receiving terminal 24) accesses the URL to obtain the data via HTTP or FTP.

Specifically, in the basic procedure shown in FIG. 9, as in the second communication mode, first, the transmitting terminal 22 (T1) stores transmission data in the temporary data storage unit 260 (T1-work) (in FIG. 9, "Put [Data]"), and is rendered accessible by using a standard protocol for data transfer, such as HTTP. Further, the transmitting terminal 22 uses UPnP to obtain an external address port corresponding to the HTTP URL from the blocking device 70 such as a NAT device or FW device, which is a feature of the third communication mode.

The transmitting terminal 22 stores transmission data in the temporary data storage unit 260. When a publicly accessible URL is obtained from the data transfer protocol processor 230 (the HTTP protocol processor 232 or the FTP protocol processor 234), first, the transmitting terminal 22 uses UPnP to send an external IP address request message (Get External IP Address (A)), shown in FIG. 10A, for requesting address translation to the blocking device 70 such as a NAT device or FW device. In response to the external IP address request message, the blocking device 70 generates an externally accessible IP address corresponding to the URL, and returns a response message (Get External IP Address Response (B)), shown in FIG. 10B, including the external IP address to the transmitting terminal 22. In this example, the external IP address (global address) is "10.20.30.40" is (see the line with "*" in FIG. 10B).

Upon receipt of the response message, the transmitting terminal 22 associates an external port available to the public, a publicly available protocol, an internal port available to the public, and a client that opens the internal port (that is, the transmitting terminal 22), and sends a port mapping message (Add Port Mapping (C)), shown FIG. 11A, including the port mapping information, to the blocking device 70. In response to the port mapping message, the blocking device 70 returns a response message (Add Port Mapping Response (D)), shown in FIG. 11B, to the transmitting terminal 22. In this example, the external port available to the public is "10080", the internal port available to the public is "80", and the publicly available protocol is "TCP" (see the lines with "*" in FIG. 11A). The blocking device 70 stores the port mapping information in an internal port mapping data holding unit, and permits communication in accordance with the port mapping between the transmitting terminal 22 and the receiving terminal 24.

Upon receipt of the response message, the transmitting terminal 22 reflects the information obtained using the blocking device 70 such as a NAT device or an FW device, and writes necessary information, such as the external IP address, paths, and a publicly accessible URL (in FIG. 12A, "http://10.20.30.40:10080/someimage.jpeg"), in the "Content-Type" header of an INVITE request message (E) shown in FIG. 12A, (see the lines with "*1", "*2", and "*3" in FIG. 12A). The transmitting terminal 22 transmits the request message to the SIP server device 40 (SIP Server).

Upon receipt of the INVITE request message, the SIP server device 40 forwards a necessary part of the INVITE request message to the receiving terminal 24 (T2), which is designated as the data transfer destination in the "INVITE sip" header of the INVITE request message. In response to the transferred INVITE request message, the receiving terminal 24 returns a "200 OK" response message, which is a response indicating successful reception, to the transmitting terminal 22 via the SIP server device 40. Upon receipt of the "200 OK" response message, the transmitting terminal 22 returns an "ACK" response message, which is a response indicating acknowledgement, to the receiving terminal 24 via the SIP server device 40.

Upon receipt of the "ACK" response message, the receiving terminal 24 issues a GET message (F), shown in FIG. 12(B), based on the type of the data transfer protocol or address information contained in the "Content-Type" header of the INVITE request, and sends the GET message (F) to the transmitting terminal 22 to make an attempt to obtain the data. In this example, "http://10.20.30.40:10080/someimage.jpeg" is sent to the transmitting terminal 22. In the network system 1 shown in FIG. 8, normally, a request message from the receiving terminal 24 to the transmitting terminal 22 is blocked and is not permitted to pass through the blocking device 70. However, port mapping for authorizing external access is set in advance in the request message, and, therefore, the communication in accordance with the port mapping between the transmitting terminal 22 and the receiving terminal 24 is authorized. Upon receipt of the GET message (F), the transmitting terminal 22 transmits a "200 OK" response message (G) with data, shown in FIG. 12C, to the receiving terminal 24.

In the third communication mode, therefore, the operation of the transmission-side data communication device 20 (the transmitting terminal 22) differs from that in the second communication mode. Meanwhile, the reception-side data communication device 20 (the receiving terminal 24) obtains the data according to the same procedure as that of the second communication mode although the URLs to be accessed differ.

Accordingly, in the third communication mode, in a system having blocking means for blocking external access to a transmission-side communication device such as NAT or firewall, the SIP protocol processor 250 of the transmitting terminal 22 obtains an address available to the receiving terminal 24 corresponding to transmission data from the blocking device 70 such as NAT, and sends the obtained address to the receiving terminal 24. The receiving terminal 24 only accesses the sent address to receive the data properly even over a firewall.

Improved Procedure of Third Communication Mode

In the basic procedure of the third communication mode, transmission data is stored in the temporary data storage unit 260 in the initial stage of the data transmission procedure, as in the second communication mode, and UPnP is used to perform address translation and generation of port mapping. However, it is difficult for the transmitting terminal 22 to properly and efficiently determine whether or not to delete the temporarily stored transmission data (an example of temporary data), and it is also difficult for the blocking device 70 to properly and efficiently determine whether or not to delete the port mapping information (another example of temporary data).

Due to the limited capacity of the temporary data storage unit 260 or the port mapping data holding unit of the blocking device 70, if data is continuously stored, the third communication mode is not implemented when the capacity limit has been reached. It is conceivable to sequentially delete older data after the capacity limit has been reached, in which case it is difficult to determine whether or not to delete them.

In this embodiment, the problems involved with the third communication mode are solved by a mechanism discussed below. In order to solve the problems, as in the improved procedure of the second communication mode, a provisional response is transmitted from the receiving terminal 24 to the transmitting terminal 22. Also, in the third communication mode, it is preferable that an INVITE request, which is a request that allows the transmission of a final response to be postponed, be used as a provisional response, thereby solving the problems discussed above.

In the third communication mode in which the blocking device 70, such as a NAT device or FW device, generates and obtains an external address port corresponding to the URL and the actual data is transferred between the transmitting terminal 22 and the receiving terminal 24 using a data transfer protocol such as HTTP, as illustrated in the improved procedure shown in FIG. 13, as in the second communication mode, in response to the forwarded INVITE request message, the receiving terminal 24 transmits a provisional response, such as a "183 Session Progress" message, to the transmitting terminal 22 via the SIP server device 40, instead of immediately returning a "200 OK" response message, which is a response indicating the completion of the reception of the data, so that the transmission of the final response can be postponed.

Upon receipt of the "200 OK" response message (final response), the transmitting terminal 22 uses UPnP to submit a deletion instruction of the port mapping information (Delete Port Mapping) to the blocking device 70 such as a NAT device or FW device. In response to the deletion instruction, the blocking device 70 deletes the stored port mapping information, and returns a response message (Delete Port Mapping Response) to the transmitting terminal 22. In response to the response message, the transmitting terminal 22 can safely and reliably delete the temporarily stored transmission data from the temporary data storage unit 260 after the port mapping has been deleted. While the temporarily stored transmission data is deleted after a deletion instruction of the port mapping and an acknowledgement response thereto have been issued, the temporarily stored transmission data may be deleted before a deletion instruction of the port mapping is issued.

As indicated by dotted lines in FIG. 13, when the receiving terminal 24 fails to obtain the data via a data transfer protocol, it transmits a failure response, such as a "404 Not Found" message, to the transmitting terminal 22 via the SIP server device 40. The transmitting terminal 22 that has received the failure response determines that the data transfer in accordance with the third communication mode has failed. In this case, the transmitting terminal 22 does not submit a deletion instruction of the port mapping information to the blocking device 70 or perform deletion of the temporarily stored transmission data from the temporary data storage unit 260, and makes an attempt to establish the communication according to the same third communication mode or a more sophisticated communication mode.

System Configuration Implementing Fourth Mode

Figure 14:
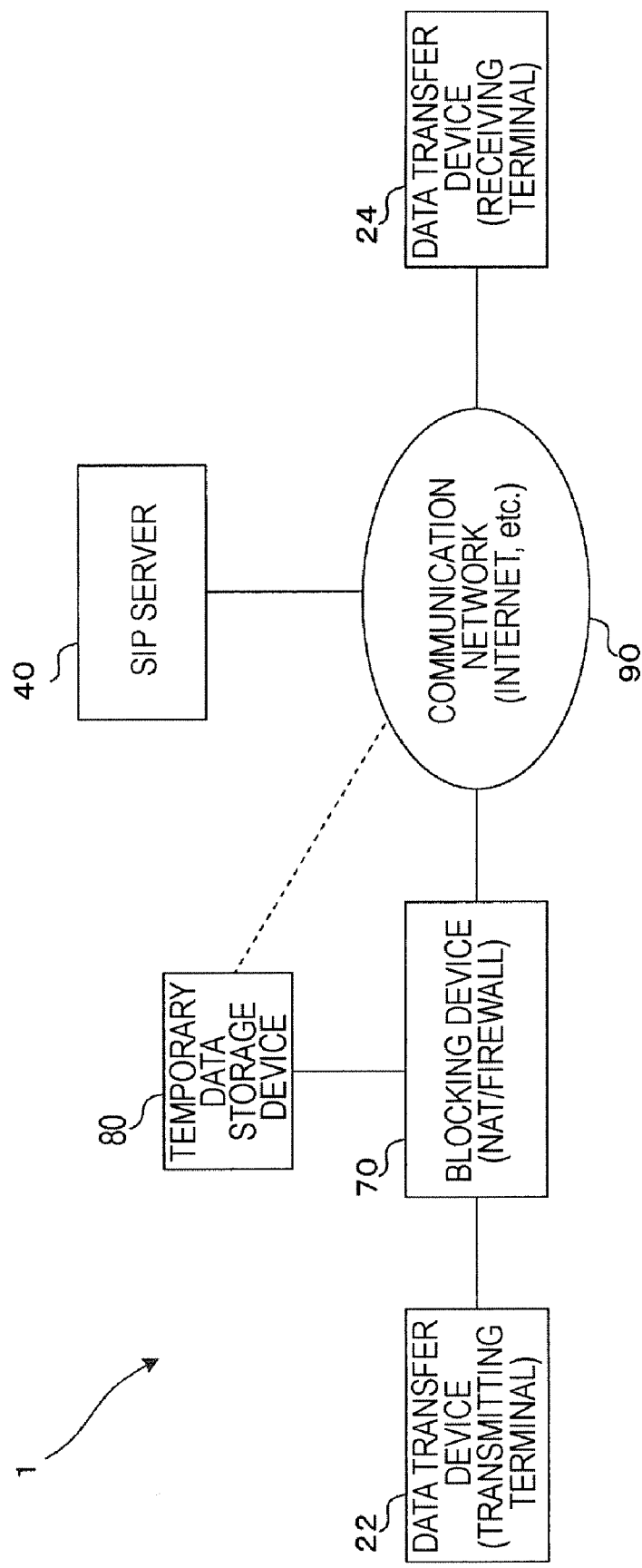
FIG. 14 is a diagram showing an example network system configuration of a network system implementing a fourth communication mode.

FIG. 14 illustrates an example network system configuration of a network system 1 implementing a fourth communication mode (hereinafter also referred to as a "fourth mode"). In the network system 1 for the fourth mode, the transmitting terminal 22 is provided behind a NAT device or FW device, and no data transfer protocol connection from the receiving terminal 24 is established using the same mode as the second communication mode. The fourth communication mode is suitable for cases where the transmission-side data communication device 20 (the transmitting terminal 22) is rendered externally inaccessible and where means for controlling a NAT device or FW device is provided although a temporary data storage device provided outside the NAT device or FW device (i.e., at the side of the communication network 90, such as the Internet) is available.

The fourth mode may require more processing steps and complex processing control and is higher in level of the communication processing control than the third mode. However, due to the existence of a NAT device or firewall and no means for controlling the NAT device or firewall in the transmission-side data communication device 20, a session even in an environment, which is not handled by the third communication mode (which is lower in level of the communication processing control than the fourth mode), is handled by the fourth mode.

Specifically, as shown in FIG. 14, in the network system 1 for the fourth mode, unlike the network system 1 for the third mode, a temporary data storage device 80 (global IP="10.20.30.100") serving as data storage means for temporarily storing data to be transmitted by the data transfer protocol processor 230 of the transmitting terminal 22 is connected to the blocking device 70. As indicated by a dotted line in FIG. 14, the temporary data storage device 80 may be directly connected to the communication network 90.

The temporary data storage device 80 is an example of a data transfer device accessible from an external device (in this example, namely, the receiving terminal 24) provided outside the blocking device 70 with respect to the transmitting terminal 22 (i.e., at the side of the communication network 90). The temporary data storage device 80 is connected to the HTTP protocol processor 232 and the FTP protocol processor 234 of the data transfer protocol processor 230 of the transmitting terminal 22 via a network, and is used as an area for processing transmission data and received data, like the temporary data storage unit 260 of the transmitting terminal 22.

Example Structure of Temporary Data Storage Device

Figure 15:
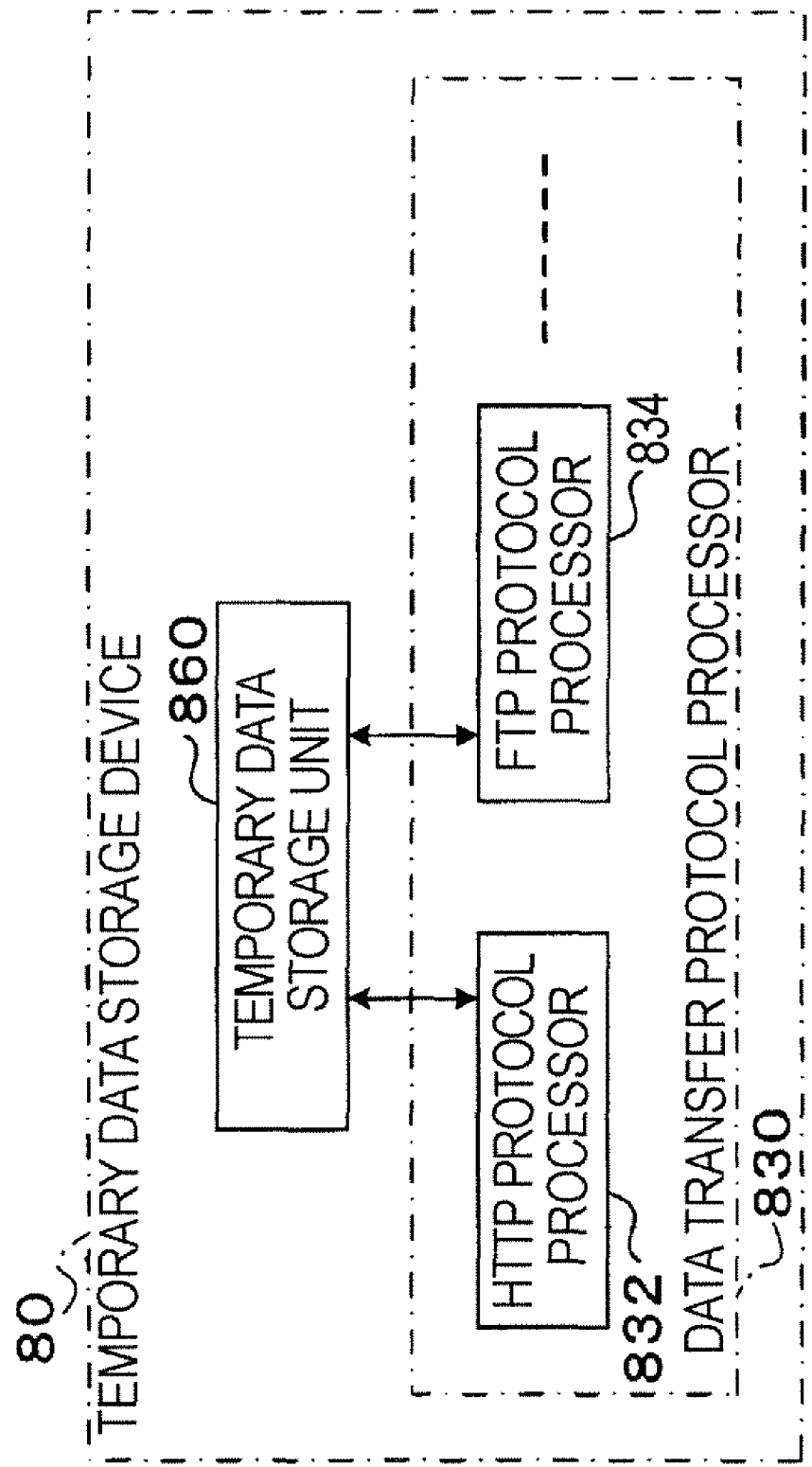
FIG. 15 is a block diagram showing an example structure of a temporary data storage device used in the network system for the fourth mode.

FIG. 15 is a block diagram showing an example structure of the temporary data storage device 80 used in the network system 1 for the fourth mode. As shown in FIG. 15, the temporary data storage device 80 includes a data transfer protocol processor 830 having various protocol processors, such as an HTTP protocol processor 832 that performs communication for data transfer according to the HTTP protocol and an FTP protocol processor 834 that performs communication for data transfer according to the FTP protocol, and a temporary data storage unit 860 that temporarily stores data. The temporary data storage device 80 may be further provided with a controller unit (not shown) that controls the respective components of the temporary data storage device 80, as needed. If the controller unit is not provided, the external data communication device 20 may remotely control the respective components of the temporary data storage device 80 directly.

The data transfer protocol processor 830 and the protocol processors included in the data transfer protocol processor 830 have functions similar to the data transfer protocol processor 230 and the protocol processors included therein. The temporary data storage unit 860 has functions similar to the temporary data storage unit 260. The temporary data storage unit 860 is internally connected to the HTTP protocol processor 832 and the FTP protocol processor 834 of the transfer protocol processor 830, and is used as an area for processing transmission data and received data.

Fourth Communication Mode

Figure 16:
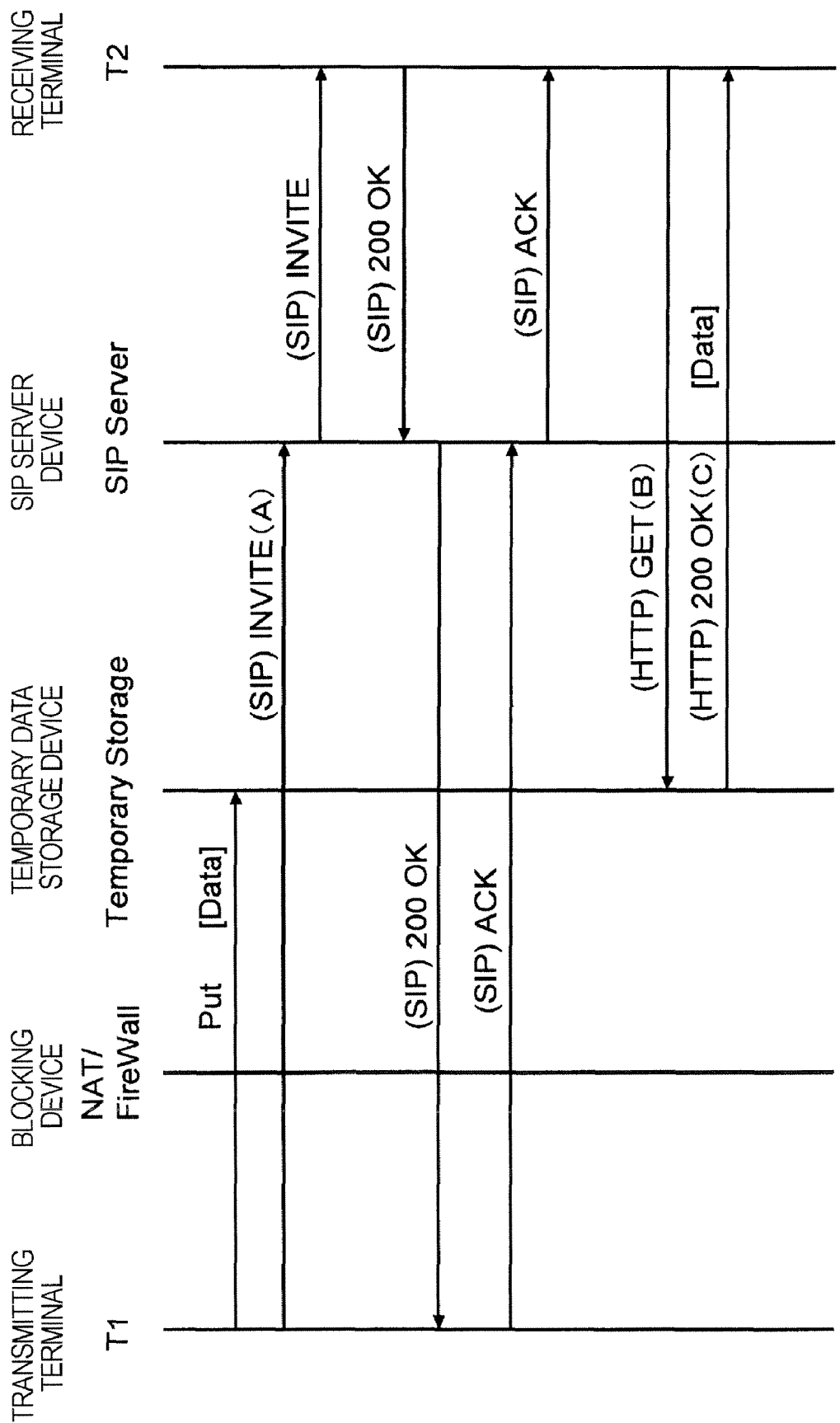
FIG. 16 is a sequence diagram showing a basic procedure of the fourth communication mode in the network system shown in FIG. 14.
Figure 18:
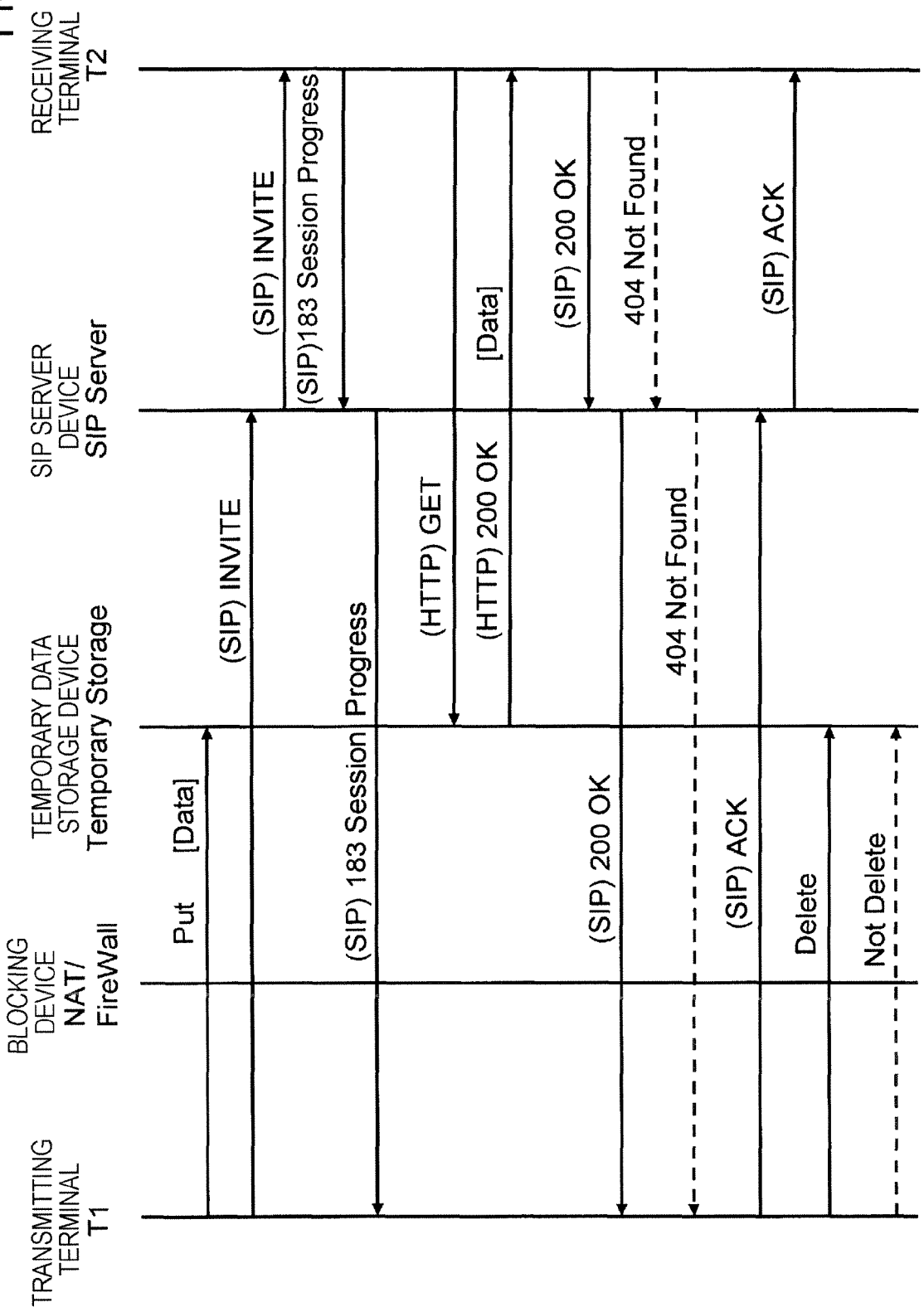
FIG. 18 is a sequence diagram showing an improved procedure of the fourth communication mode.

FIG. 16 is a sequence diagram showing a basic procedure of the fourth communication mode in the network system 1 shown in FIG. 14. FIGS. 17A to 17C illustrate examples of messages used in the basic procedure of the fourth communication mode. FIG. 18 is a sequence diagram showing an improved procedure of the fourth communication mode.

In the first communication mode, the temporary data storage unit 260 is included in the transmitting terminal 22. In the fourth communication mode, on the other hand, the temporary data storage device 80 is provided outside the transmitting terminal 22 so as to be accessible from outside a NAT device or FW device. Nevertheless, the basic procedure of the fourth communication mode is similar to that of the second communication mode.

Since the blocking device 70, such as a NAT device or FW device, is provided between the transmitting terminal 22 and the temporary data storage device 80, the transmitting terminal 22 stores transmission data in the temporary data storage device 80, and uses UPnP to obtain an external address port (global IP address) from the blocking device 70 such as a NAT device or FW device, as in the third communication mode. The obtained external address port is written together with a publicly accessible URL in an INVITE request message. The reception-side data communication device 20 accesses the temporary data storage device 80 to obtain the data from the publicly accessible URL via HTTP, FTP, or the like.

Specifically, in the basic procedure shown in FIG. 16, first, the transmitting terminal 22 (T1) is rendered accessible by using a standard protocol for data transfer, such as HTTP. The transmitting terminal 22 further obtains a global IP address corresponding to the private IP address from the blocking device 70 to perform communication with a communication terminal having a global address available within the Internet (in this example, the receiving terminal 24 or the temporary data storage device 80). In this example, the new external IP address (global address) is "10.20.30.40".

The transmitting terminal 22 transmits and stores transmission data to the temporary data storage device 80 (temporary storage) (in FIG. 16, "Put [Data]") via a data transfer protocol such as FTP, and obtains a publicly accessible URL from the data transfer protocol processor 230 (the HTTP protocol processor 232 or the FTP protocol processor 234). As shown in FIG. 17A, the transmitting terminal 22 writes necessary information, such as the external IP address, paths, and URL that reflect the global address information obtained using the blocking device 70 such as a NAT device or FW device, in the "Content-Type" header of the INVITE request message (A) (see the lines with "*1", "*2", and "*3" in FIG. 17A), and transmits the request message to the SIP server device 40 (SIP Server). In this example, the URL is "http://10.20.30.100/tmp/T1/someimage.jpeg".

Upon receipt of the INVITE request message, the SIP server device 40 forwards a necessary part of the INVITE request message to the receiving terminal 24 (T2), which is designated as the data transfer destination in the "INVITE sip" header of the INVITE request message. In response to the forwarded INVITE request message, the receiving terminal 24 returns a "200 OK" response message, which is a response indicating successful reception, to the transmitting terminal 22 via the SIP server device 40. Upon receipt of the "200 OK" response message, the transmitting terminal 22 returns an "ACK" response message, which is a response indicating acknowledgement, to the receiving terminal 24 via the SIP server device 40.

Upon receipt of the "ACK" response message, the receiving terminal 24 issues a GET message (B), shown in FIG. 17B, based on the type of the data transfer protocol or address information contained in the "Content-Type" header of the INVITE request, and sends the GET message (B) to the data storage device 80 to make an attempt to obtain the data. In this example, "http://10.20.30.100/tmp/T1/someimage.jpeg HTTP/1.0" is sent to the temporary data storage device 80. In response to the GET message (B), the temporary data storage device 80 transmits a "200 OK" response message (C) with data, shown in FIG. 17C, to the receiving terminal 24.

In the fourth communication mode, therefore, the operation of the transmission-side data communication device 20 (the transmitting terminal 22) differs from that in the second or third communication mode. Meanwhile, the reception-side data communication device 20 (the receiving terminal 24) obtains the data according to the same procedure as that of the second communication mode although the URLs to be accessed and the access destinations differ.

In a case where the transmitting terminal 22 is not provided with the function of obtaining an address available to the receiving terminal 24 corresponding to transmission data from blocking means such as NAT, the SIP protocol processor 250 of the transmitting terminal 22 notifies the receiving terminal 24 of the address available to the receiving terminal 24 corresponding to the transmission data if the temporary data storage device 80 provided outside the blocking device 70 with respect to the transmitting terminal 22 is available. Therefore, the receiving terminal 24 accesses the notified address to receive the data properly from the temporary data storage device 80 provided outside the blocking device 70 with respect to the transmitting terminal 22.

Improved Procedure of Fourth Communication Mode

In the basic procedure of the fourth communication mode, transmission data is stored in the temporary data storage device 80 in the initial stage of the data transmission procedure, substantially as in the second communication mode. However, it is difficult for the transmitting terminal 22 or the temporary data storage device 80 to properly or efficiently determine whether or not to delete the temporarily stored transmission data. Due to the limited capacity of the temporary data storage device 80, if data is continuously stored, the fourth communication mode is not implemented when the capacity limit has been reached. It is conceivable to sequentially delete older data after the capacity limit has been reached, in which case it is difficult to determine whether or not to delete them.

In this embodiment, the problem involved with the fourth communication mode is solved by a mechanism discussed below. In order to solve the problem, as in the improved procedure of the second communication mode, a provisional response is transmitted from the receiving terminal 24 to the transmitting terminal 22. Also, in the fourth communication mode, it is preferable that an INVITE request, which is a request that allows the transmission of a final response to be postponed, be used as a provisional response, thereby solving the problem discussed above.

In the fourth communication mode in which when the blocking device 70, such as a NAT device or FW device, is provided at the side of the transmitting terminal 22 and the temporary data storage device 80 externally accessible from the data communication device 20 (in this example, the receiving terminal 24) is provided outside the blocking device 70, the actual data is transferred between the transmitting terminal 22 and the receiving terminal 24 indirectly with the intervention of the temporary data storage device 80 using a data transfer protocol such as HTTP, as illustrated in the improved procedure shown in FIG. 18, as in the second communication mode, in response to the forwarded INVITE request message, the receiving terminal 24 transmits a provisional response, such as a "183 Session Progress" message, to the transmitting terminal 22 via the SIP server device 40, instead of immediately returning a "200 OK" response message, which is a response indicating the completion of the reception of the data, so that the transmission of the final response can be postponed.

Upon receipt of the "200 OK" response message (final response), the transmitting terminal 22 issues a deletion instruction (Delete Port Mapping) of the temporarily stored transmission data. In response to the deletion instruction, the temporary data storage device 80 deletes the stored transmission data. Therefore, the transmitting terminal 22 can safely and reliably delete the transmission data from the temporary data storage device 80.

As indicated by dotted lines in FIG. 18, when the receiving terminal 24 fails to obtain the data via a data transfer protocol, it transmits a failure response, such as a "404 Not Found" message, to the transmitting terminal 22 via the SIP server device 40. The transmitting terminal 22 that has received the failure response determines that the data transfer in accordance with the fourth communication mode has failed. In this case, the transmitting terminal 22 does not submit a deletion instruction of the transmission data to the temporary data storage device 80, and makes an attempt to establish the communication according to the same fourth communication mode or a more sophisticated communication mode.

Data Transfer Mode Selection Algorithm on Transmission Side

Figure 19:
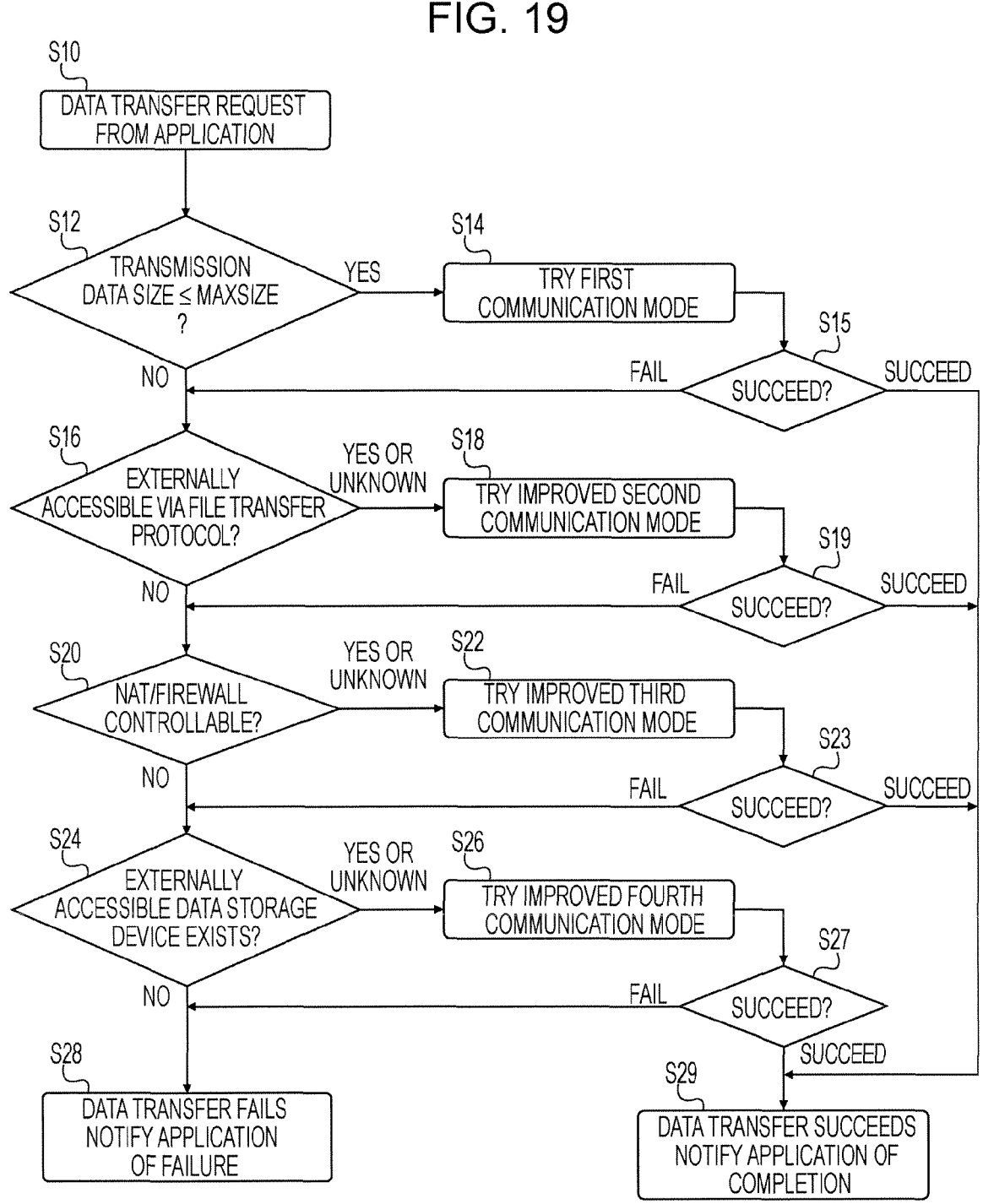
FIG. 19 is a flowchart showing an operation procedure on the transmission side for implementing arbitrary data transfer using any of the first to fourth communication modes.

FIG. 19 is a flowchart showing an operation procedure on the transmission side for implementing arbitrary data transfer between terminals on the SIP service infrastructure using any of the first to fourth communication modes (with regard to the second to fourth communication modes, the improved procedures thereof). FIG. 19 illustrates a processing algorithm, namely, an algorithm for selecting a data transfer mode, in the controller unit 220 of the transmission-side data communication device 20 (transmitting terminal 22).

In the transmitting terminal 22, the controller unit 220 determines and selects an optimum one of the first to fourth communication modes depending on the situation, while taking into consideration the network environment between the transmitting terminal 22 and the receiving terminal 24, the amount of transfer data, and so forth, before starting the transfer of the actual data.

Specifically, as shown in FIG. 19, first, the controller unit 220 of the transmitting terminal 22 receives a data transfer request from the application unit 210 (step S10), and, then, determines whether or not the size of transmission data is a maximum value MAXSIZE or less (step S12; the first determination step). The maximum value MAXSIZE is determined according to the SIP specification.

If the transmission data size is the maximum value MAXSIZE or less ("Yes" in step S12), the controller unit 220 makes an attempt to establish transmission in accordance with the first communication mode (step S14), and determines whether or not the transmission in accordance with the first communication mode has no problem (step S15). If the attempt of the transmission in accordance with the first communication mode succeeds ("succeed" in step S15), the controller unit 220 notifies the application unit 210 if the transfer of the data is completed (step S29). In effect, the attempt of the transmission in accordance with the first communication mode in step S14 leads to actual data transfer.

If the data size is greater than the value MAXSIZE ("No" in step S12), or if the transmission in accordance with the first communication mode fails ("fail" in step S15), e.g., if a "200 OK" success response is not received within a predetermined period of time from the receiving terminal 24, the controller unit 220 determines whether or not the second communication mode, which is more sophisticated than the first communication mode, is available. Specifically, first, the controller unit 220 uses the information set in the application or other methods to determine whether or not the network configuration (see FIG. 8) that allows external access via a file transfer protocol, such as HTTP or FTP, is satisfied (step S16; the second determination step).

If it is clear that the network configuration (see FIG. 8) described above is satisfied or if it is not possible to determine that the network configuration (see FIG. 8) is unsatisfied ("Yes or Unknown" in step S16), the controller unit 220 makes another attempt to establish transmission in accordance with the second communication mode (improved procedure) (step S18), and determines whether or not the transmission in accordance with the second communication mode (improved procedure) has no problem (step S19). If the attempt of the transmission in accordance with the second communication mode (improved procedure) succeeds ("succeed" in step S19), the controller unit 220 notifies the application unit 210 if the transfer of the data is completed (step S29). In effect, the attempt of the transmission in accordance with the second communication mode in step S18 leads to actual data transfer.

If it is possible to determine that the network configuration (see FIG. 8) is unsatisfied ("No" in step S16) or if the transmission in accordance with the second communication mode (improved procedure) fails ("fail" in step S19), e.g., if a "404 Not Found" failure response is received from the receiving terminal 24, the controller unit 220 determines whether or not the third communication mode, which is more sophisticated than the second communication mode, is available. Specifically, first, the controller unit 220 uses the information set in the application or other methods to determine whether or not the network configuration (see FIG. 8) in which the factor of external inaccessibility via a file transfer protocol (that is, the blocking device 70 shown in FIG. 8, such as a NAT device or FW device), can be controlled by using UPnP or the like is satisfied (step S20; the third termination step).

If it is clear that the NAT device or FW device is controllable using UPnP or the like, or if it is not possible to determine that it is uncontrollable ("Yes or unknown" in step S20), the controller unit 220 makes an attempt to establish transmission in accordance with the third communication mode (improved procedure) (step S22), and determines whether or not the transmission in accordance with the third communication mode (improved procedure) has no problem (step S23). If the attempt of the transmission in accordance with the third communication mode (improved procedure) succeeds ("succeed" in step S23), the controller unit 220 notifies the application unit 210 if the transfer of the data is completed (step S29). In effect, the attempt of the transmission in accordance with the third communication mode in step S22 leads to actual data transfer.

If it is possible to determine that the NAT device or FW device is uncontrollable using UPnP or the like ("No" in step S20) or if the transmission in accordance with the third communication mode (improved procedure) fails ("fail" in step S23), e.g., if a "404 Not Found" failure response is received from the receiving terminal 24, the controller unit 220 determines whether or not the fourth communication mode, which is more sophisticated than the third communication mode, is available. Specifically, first, the controller unit 220 uses the information set in the application or other methods to determine whether or not the network configuration (see FIG. 14) that includes the temporary data storage device 80 externally accessible via a data transfer protocol is satisfied (step S24; the fourth determination step).

If it is clear that the network configuration (see FIG. 14) is satisfied, or if it is not possible to determine that the network configuration (see FIG. 14) is unsatisfied ("Yes or unknown" in step S24), the controller unit 220 makes an attempt to establish transmission in accordance with the fourth communication mode (improved procedure) (step S26), and determines whether or not the transmission in accordance with the fourth communication mode (improved procedure) has no problem (step S27). If the attempt of the transmission in accordance with the fourth communication mode (improved procedure) succeeds ("succeed" in step S27), the controller unit 220 notifies the application unit 210 if the transfer of the data is completed (step S29). In effect, the attempt of the transmission in accordance with the fourth communication mode in step S26 leads to actual data transfer.

If it is possible to determine that the network configuration (see FIG. 14) is unsatisfied ("No" in step S24) or if the transmission in accordance with the fourth communication mode (improved procedure) fails ("fail" in step S27), e.g., if a "404 Not Found" failure response is received from the receiving terminal 24, the controller unit 220 determines that the data transmission has failed and notifies the application unit 210 (step S28).

While, in the example described above, attempts of a plurality of communication modes stepwise from the lowest level to the highest level, i.e., from the first communication mode to the fourth communication mode, are made, this is not essential. However, an attempt to establish communication in accordance with a low-level communication mode is initially made, and, if the attempt fails, a second attempt to establish the communication in accordance with a higher-level communication mode is made, thus allowing waste-reduction efficient communication as a whole (including a processing load on the terminals, as well as a network load and communication cost).

Responding Algorithm on Reception Side

Figure 20:
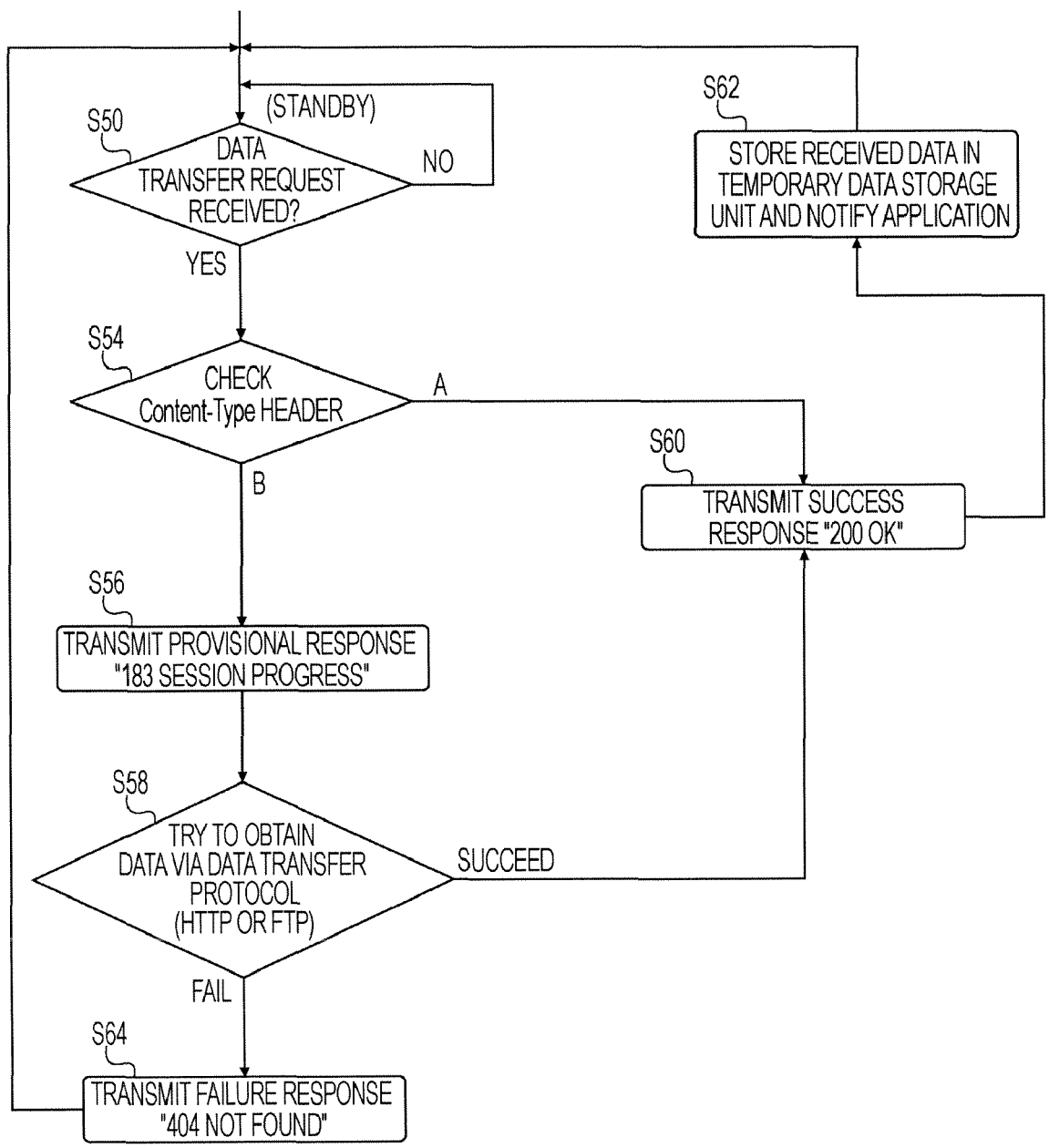
FIG. 20 is a flowchart showing an operation procedure on the reception side for implementing arbitrary data transfer using any of the first to fourth communication modes.

FIG. 20 is a flowchart showing an operation procedure on the reception side for implementing arbitrary data transfer between terminals on the SIP service infrastructure using any of the first to fourth communication modes (with regard to the second to fourth communication modes, the improved procedures thereof). FIG. 20 illustrates a processing algorithm in the controller unit 220 of the transmission-side data communication device 20 (the transmitting terminal 24) in response to a received INVITE request for data transfer.

In the receiving terminal 24, the controller unit 220 checks the "Content-Type" header in the INVITE request message of the received data, and performs predetermined receiving processing according to the check result.

Specifically, as shown in FIG. 20, first, the controller unit 220 of the receiving terminal 24 is in a standby mode ("No" in step S50). In the standby mode, when the SIP protocol processor 250 receives a data-transfer INVITE request with the request URI containing parameter "user=data" ("Yes" in step S50), the controller unit 220 checks the "Content-Type" header in the request message (step S54). If the transferred data is directly attached to the body of the "Content-Type" header of the request message ("A" in step S54), e.g., if "image/jpeg" is contained and JPEG data is added, the controller unit 220 immediately transmits a "200 OK" success response to the transmitting terminal 22 (step S60). The controller unit 220 stores the received data attached to the body in the temporary data storage unit 260, and notifies the application of the received data (step S62). Then, the controller unit 220 returns to the standby mode (step S50). The received data (an example of temporary data) temporarily stored in the temporary data storage unit 260 is deleted once the application unit 210 has obtained the data from the temporary data storage unit 260.

If the "Content-Type" header contains information for obtaining the data using another data transfer protocol or access destination information, such as an access destination (e.g., URL) via a data transfer protocol ("B" in step S54), the controller unit 220 transmits a "183 Session Progress" provisional response to the transmitting terminal 22 (step S56), and then makes an attempt to obtain the data using the designated data transfer protocol (such as HTTP or FTP) (step S58). For example, when the value of the "Content-Type" header is "message/external-body; ACCESS-TYPE=URL; URL="http://10.20.30.40:10080/someimage.jpeg", the controller unit 220 makes an attempt to obtain the data using HTTP from URL "http://10.20.30.40:10080/someimage.jpeg".

If the data is successfully obtained ("succeed" in step S58), the controller unit 220 transmits a "200 OK" success response to the transmitting terminal 22 (step S60). Then, the controller unit 220 stores the received data attached to the body in the temporary data storage unit 260, and notifies the application of the received data (step S62). Then, the controller unit 220 returns to the standby mode (step S50). The received data (an example of temporary data) temporarily stored in the temporary data storage unit 260 is deleted once the application unit 210 has obtained the data from the temporary data storage unit 260.

If the data is not successfully obtained ("Fail" in step S58), the controller unit 220 transmits a "404 Not Found" failure response to the transmitting terminal 22 (step S64), and then returns to the standby mode (step S50).

If the receiving terminal 24 succeeds to receive the data, the application unit 210 performs predetermined data processing based on the received data. For example, in IP telephone applications, audio information based on audio data is presented to a user by means of a headset (an example of audio information input/output means). In television telephone or videoconferencing applications, audio information based on audio data is presented to a user by means of audio information output means, such as a speaker, and an image based on image data is presented to the user by means of a monitor device (an example of image information output means), such as a liquid crystal display (LCD) or a cathode ray tube (CRT). In image communication applications, for example, received JPEG data is decompressed (decoded) by a decoding processor, and is then converted into output color (typically, four-CMKY-color) data corresponding to color material (such as toner or ink) by an image processor so that an image is recorded and output on a predetermined output medium (typically, a sheet of paper) by an image forming unit.

Accordingly, in cooperative communication by the transmitting terminal 22 and the receiving terminal 24 using the SIP server device 40, the transmission-side data communication device 20 (the transmitting terminal 22) is notified of a transfer result of an attempt of a data transfer mode without extension of the SIP protocol. Attempts of a plurality of communication modes are sequentially made (preferably, stepwise in order from the lowest level to the highest level) to transfer data between terminals directly or using the temporary data storage device 80 according to a communication mode suitable for the actual environment. Further, a completion notification is sent from the receiving terminal 24 to the transmitting terminal 22 when the receiving terminal 24 completes the reception of the data, thus allowing the transmitting terminal 22 to safely and reliably delete unnecessary temporary data.

As discussed above, according to the communication processing of the above-described embodiment, it is reliably feasible to directly transfer arbitrary data, such as audio and image data files, between the data communication devices 20 capable of establishing a call connection therebetween on a SIP service infrastructure or between software applications installed in the data communication devices 20 without being affected by the amount of data or the communication environment.

Even a session between terminals provided within NAT or FW, which are not capable of transferring data using an existing data transfer mode alone, is implemented according to the fourth communication mode by using the temporary data storage device 80 provided outside the NAT or FW.

Since the fundamental portion of normal call control in SIP protocols (i.e., the INVITE request in the above-described embodiments) is used to implement data transfer, there is less possibility of a connectivity problem in data transfer on an existing SIP infrastructure than methods using a MESSAGE request, a NOTIFY request, and so forth.

Further, the reception-side data communication device 20 (the receiving terminal 24) notifies the transmission-side data communication device 20 (the transmitting terminal 22) of a result of an attempt of data transfer by means of a SIP response, thus allowing the transmitting terminal 22 to sequentially make attempts of a plurality of data transfer modes. Thus, even if the network environment is unknown, reliable data transfer is achieved according to a suitable communication mode depending on the actual environment, and unnecessary temporary data can be deleted based on a completion notification of the data transfer sent from the receiving terminal 24 to the transmitting terminal 22.

Configuration Using Electronic Calculator

In the foregoing embodiments, the mechanism for performing communication is not limited to that configured by using the hardware processing circuit, and may also be implemented in software by using an electronic calculator (computer) based on program code implementing this function.

Thus, a program adapted to implement a communication method and communication device according to embodiments of the present invention in software by using an electronic calculator (computer) or a computer-readable storage medium having the program stored therein may constitute embodiments of the present invention.

If the series of communication processing functions is executed in software by an electronic calculator, a program of the software is installed from a recording medium onto a computer (such as a built-in microcomputer) included in dedicated hardware, alternatively, a system on a chip (SOC) system in which functions of a central processing unit (CPU), a logic circuit, a storage device, and so forth are mounted on a single chip to implement a desired system, or a general-purpose personal computer that is capable of executing various functions with various programs installed thereon.

A recording medium induces states of change in magnetic, optical, or electrical energy of a reading device provided in a hardware resource of the computer in accordance with the descriptive contents of a program to enable the descriptive contents of the program to be transferred to the recording device in the corresponding signal form.

The recording medium may be implemented as a packaged medium (portable storage medium), which is distributed to provide the program to a user separately from the computer, such as a magnetic disc (including a flexible disc (FD)), an optical disc (including a compact disc-read only memory (CD-ROM), and a digital versatile disc (DVD)), a magneto-optical disc (including a Mini Disc (MD)), or a semiconductor memory, on which the program is recorded, or a medium, which is provided to a user as a medium pre-installed in the computer, such as a ROM or a hard disc, on which the program is recorded.

A program of the software is not necessarily provided via a recording medium, and may be provided via a communication network, such as a wired or wireless network, without using a recording medium.

For example, a storage medium having recorded thereon program code of the software implementing a communication processing function may be fed to a system or an apparatus, and a computer of the system or apparatus (or a CPU or MPU) may read and execute the program code stored in the storage medium, whereby advantages similar to those achieved by the hardware processing circuit can be achieved. In this case, the program code read from the storage medium implements the communication processing function.

Further, the function of performing communication may be implemented by not only executing the program code read by the computer but also executing all or a portion of the actual processing according to the instruction of the program code by means of an operating system (OS) (basic software) running on the computer.

Further, the function of performing communication may be implemented by writing the program code read from the storage medium to a memory of a function extension card loaded on the computer or a function extension unit connected to the computer so that a CPU or the like of the function extension card or function extension unit executes all or a portion of the actual processing according to the instruction of the program code.

A program is provided as a file having written therein program code for implementing the function of performing communication. The program may not be provided as a batch program file, and may be provided as individual program modules depending on the hardware configuration of a system composed of a computer.

Figure 21:
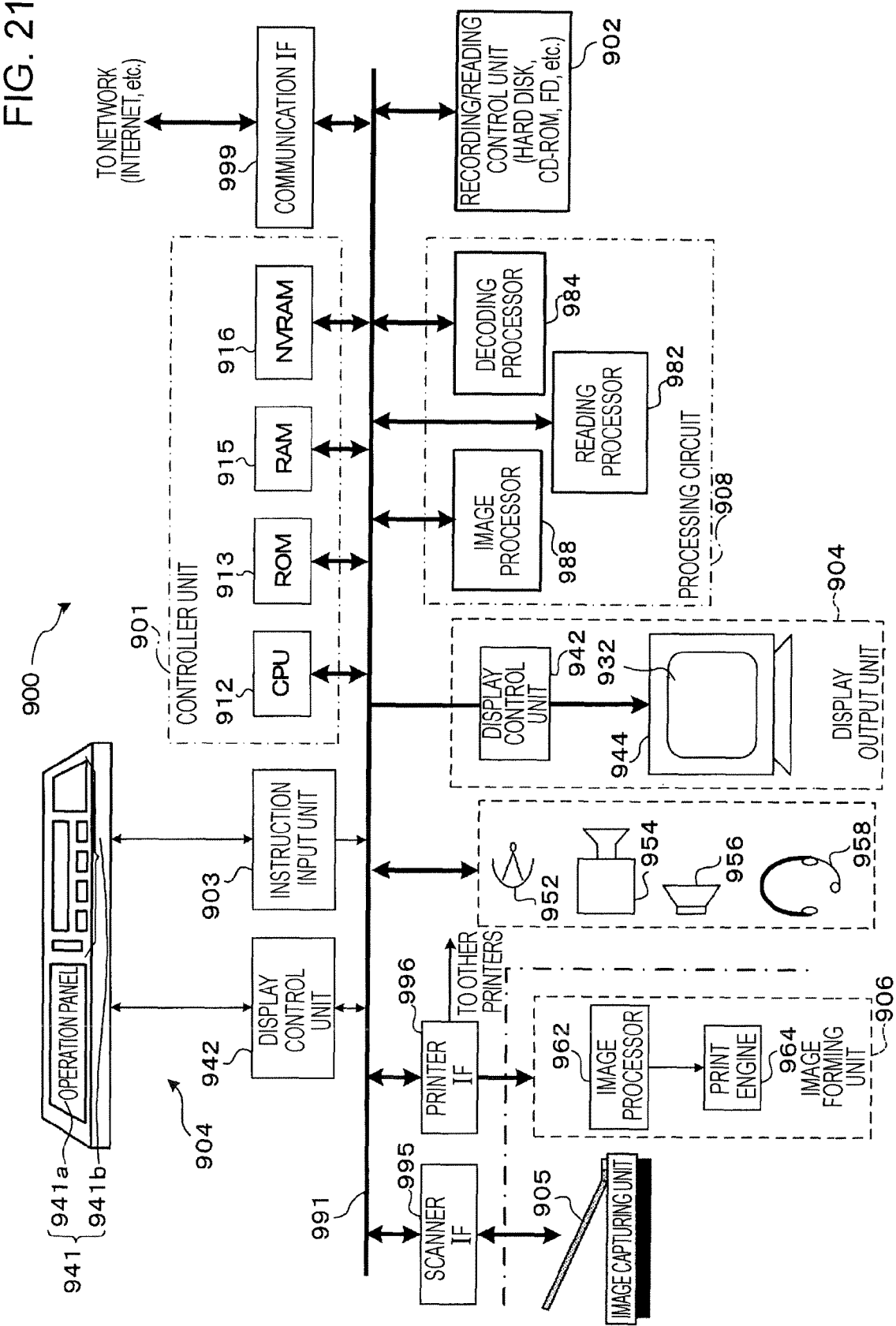
FIG. 21 is a block diagram showing an example hardware configuration of a communication device formed of an electronic calculator.

FIG. 21 is a block diagram of a computer system 900 serving as the data communication device 20 having a function of performing communication in software using a CPU or a memory. That is, FIG. 21 illustrates an example hardware configuration in which the communication is implemented in software by using functions of a computer (electronic calculator), such as a personal computer.

Communication may not be performed by using the configuration using a computer, and may be performed by combining dedicated hardware components for performing processing of the respective function units of the data communication device 20 shown in FIG. 2. A mechanism in which the processing is implemented in software would enjoy advantages of easily changing the processing order without changing the hardware design.

In a case where the function of implementing the communication processing function in software is installed in the data communication device 20, software, such as a control program, of a traditional communication device such as an IP telephone or a television telephone, for transmitting and receiving data to and from an external device via a network is installed in the electronic calculator shown in FIG. 21. The software includes at least a program module for performing the communication processing of the embodiment described above.

For example, the computer system 900 includes a controller unit 901, and a recording/reading control unit 902 for reading and recording data from and onto a predetermined storage medium, such as a hard disk drive, a flexible disc (FD) drive, a CD-ROM drive, or a semiconductor memory controller.

The controller unit 901 includes a CPU 912, a read only memory (ROM) 913 serving as a read-only storage unit, a random access memory (RAM) 915, which is an example of a volatile storage unit for random writing and reading, and a RAM (or NVRAM) 916, which is an example of a non-volatile storage unit. The NVRAM 916 stores temporary data and so forth. In this case, the NVRAM 916 functions as the temporary data storage unit 260.

The term "volatile storage unit" means a storage unit that loses the stored contents when the data communication device 20 is turned off. The term "non-volatile storage unit" means a storage unit that retains the stored contents when the main power of the data communication device 20 is turned off, and may include any storage unit capable of retaining the stored contents. The non-volatile storage unit is not limited to a storage unit including non-volatile semiconductor memory elements, and volatile semiconductor memory elements may be connected to a backup power supply so that the volatile semiconductor memory elements can function as "non-volatile" memory elements. The non-volatile storage unit may not be composed of semiconductor memory elements, and may be configured using a medium, such as a magnetic disc or an optical disc. For example, a hard disk device may be used as a non-volatile storage unit.

The computer system 900 further includes, as user interface function units, an operation input unit 903 having a keyboard and a mouse, and a display output unit 904 for providing predetermined information, such as a guidance screen at the operation time or a processing result, to the user.

The display output unit 904 includes a display control unit 942 and a display device. The display device may be an operation panel 941 provided for the data communication device 20. Any other display unit 944, such as a CRT or an LCD, may be used.

For example, the display control unit 942 causes guidance information or an image to be displayed on the operation panel 941 composed of a display panel 941*a*, a ten-key pad and other operation keys 941*b* or the display unit 944. The operation panel 941 or the display unit 944 may also be used as a display device for notifying the user of various kinds of information. The display unit 944 is provided with a touch panel 932 on a display surface thereof, which may serve as the operation input unit 903 for inputting certain information using a finger, a pen, or the like.

The computer system 900 further includes a function unit for performing predetermined data processing on data to be subjected to communication processing. For example, in image communication applications, the computer system 900 includes, as function units of obtaining image data to be transmitted, an image capturing unit (scanner unit) 905 for reading an image to be processed and an image forming unit 906 for outputting a processed image to a predetermined output medium (such as a sheet of print paper).

The image capturing unit 905 has the function of an image input terminal. For example, the image capturing unit 905 uses the full array of charge-coupled device (CCD) solid-state imaging devices to apply light to an original copy fed onto a read position to read an image from the original copy, and converts analog video signals of red (R), green (G), and blue (B) representing the read image into digital signals.

The image forming unit 906 forms (prints) a visible image on a sheet of plain paper or thermal paper based on an image represented by the image signals obtained by the image capturing unit 905 or received image data by using a known image forming process, such as electrophotographic, thermal, thermal transfer, inkjet, or the like.

The image forming unit 906 includes an image processor 962 for generating output print data, such as binary signal data of yellow (Y), magenta (M), cyan (C), and black (K), and a print engine 964 such as a raster-output-scan-based or inkjet print engine.

In television telephony or videoconferencing applications, the computer system 900 includes audio/image information input means such as a microphone 952 for obtaining audio data and a camera 954 for obtaining image information, audio information output means such as a speaker 956 for outputting audio information, and image information output means such as an LCD or a CRT for outputting an image. The image information output means may use the display output unit 904.

In IP telephony applications, the computer system 900 includes a headset 958 as an example of audio information input/output means for obtaining audio data to be transmitted and outputting audio information based on received audio data.

The computer system 900 further includes a system bus 991 serving as a transfer path of processed data (including image data) and control data, a scanner IF 995 that functions to interface with the image capturing unit 905, a printer IF 996 that functions to interface with the image forming unit 906 or another printer, and a communication IF 999 serving as an intermediate unit through which communication data is delivered to and from an network such as the Internet.

All of the processing operations of the function units for performing communication may not be implemented in software, and a processing circuit 908 for implementing a portion of the function units in dedicated hardware may be provided. A software-based mechanism is flexible to support concurrent or sequential operations; however, the more the complexity, the longer the processing time, resulting in low processing speed. A hardware processing circuit, on the other hand, allows an accelerator system that provides high-speed processing to be established. Although the accelerator system provides complex processing, the processing speed is not low, and high throughput is achieved.

For example, in the present embodiment in which the communication processing function is applied to the data communication device 20, the processing circuit 908 may be separately provided with a reading processor 982 for reading an image, a decoding processor 984 for decoding (decompressing) compressed image information into original image information, or an image processor 988 for implementing an image processing function of generating output print image data.

With this configuration, the CPU 912 controls the overall operation of the system 900 via the system bus 991, and corresponds to the controller unit 220 shown in FIG. 2. The ROM 913 stores a control program of the CPU 912 and so forth. The RAM 915 is formed of a static random access memory (SRAM) or the like, and stores program control variables, data for various processes, and so forth. The RAM 915 includes an area for temporarily storing a digital document (including not only text data but also image data) obtained by a predetermined application program, image data obtained by the image capturing unit 905 in the computer system 900 (data communication device 20), digital data obtained from an external device, and so forth.

For example, a program for causing a computer to execute the communication processing function is distributed via a non-transitory computer-readable storage medium, such as a CD-ROM. Alternatively, the program may be stored in an FD, instead of a CD-ROM. Alternatively, a magneto-optical (MO) drive may be provided, and the program may be stored in an MO disc, or any other non-transitory computer-readable storage medium, such as a non-volatile semiconductor memory card, e.g., a flash memory. Further, the program may be downloaded from another server or the like via a network, such as the Internet, or may be updated.

A non-transitory computer-readable storage medium for providing the program may be implemented as, other than an FD or a CD-ROM, an optical non-transitory computer-readable storage medium such as a DVD, a magnetic non-transitory computer-readable storage medium such as an MD, a magneto-optical non-transitory computer-readable storage medium such as a PD, a tape medium, a magnetic non-transitory computer-readable storage medium, or a semiconductor memory such as an IC card or a miniature card. An FD, a CD-ROM, or the like serving as an example of the recording medium may store all or a portion of the functions for implementing the communication processing function.

The hard disk drive includes an area for storing data for various processes executed by control programs and temporarily storing a large amount of image data obtained by the image capturing unit 905 or image data received from an external device. The hard disk drive, the FD drive, or the CD-ROM drive is used to register program data for causing the CPU 912 to execute processes of obtaining content, obtaining an address, or setting an address in software.

While the present invention has been described with reference to the disclosed embodiment, it is to be understood that the technical scope of the present invention is not limited to the scope described in the above-described embodiment. A variety of changes and improvements may be made to the embodiment described above without departing from the scope of the invention, and such changes and improvements may also fall within the technical scope of the present invention.

The embodiment described above is not intended to limit the invention set forth in the appended claims, and all the combinations of the features disclosed in the embodiment are not necessarily essential as the solving means for the invention. The above-described embodiment includes various aspects of the invention, and a plurality of features disclosed in the embodiment may be suitably combined to extract various aspects of the invention. Even if some of the features disclosed in the embodiment are deleted, the resulting features can be extracted as an aspect of the invention as long as they offer advantages.

For example, in the foregoing embodiment, SIP is used for call control. Any other protocol for performing call control (including protocols that are standardized at present and protocols that will be standardized in the future) may be used instead of SIP.

While, in the second and third communication modes, transmission data is temporarily stored in the temporary data storage unit 260, this is not necessarily essential. The receiving terminal 24 may be notified of an address corresponding to data to be transmitted, and when the receiving terminal 24 accesses the address, actual data to be transmitted may be obtained and the data may then be transmitted to the receiving terminal 24 via HTTP or FTP.

While, in the data transfer mode selection algorithm on the transmission side shown in FIG. 19, the first to fourth communication modes are attempted in the stated order (in the order from the lowest level to the highest level), a user can select which mode to attempt in which order. For example, in order to implement the fourth communication mode, the temporary data storage device 80 is provided outside the blocking device 70 with respect to the transmitting terminal 22, in which case the system cost increases due to the provision of the temporary data storage device 80. Thus, a system configuration without the temporary data storage device 80 may often be used. In such a case, an attempt of the fourth communication mode may be omitted, and the application unit 210 may immediately be notified if an attempt of the third communication mode fails.

While, in the first to fourth communication modes, the transmitting terminal 22 returns an "ACK" response message, which is a response indicating acknowledgement, to the receiving terminal 24 via the SIP server device 40 in response to a "200 OK" response message, the "ACK" response message indicating acknowledgement may be returned to the receiving terminal 24 without the intervention of the SIP server device 40.

It should be understood by those skilled in the art that various modifications, combinations, sub-combinations and alterations may occur depending on design requirements and other factors insofar as they are within the scope of the appended claims or the equivalents thereof.

What is claimed is:

1. A communication method for performing data communication between a transmission-side communication device and a reception side communication device via a network according to a predetermined mode, the communication method comprising the steps of:
   at the transmission-side communication device, sending a data transmission request, according to a session initiation protocol, to the reception-side communication device for transmitting transmission data to the reception side communication device;
   at the reception-side communication device, sending a substitution notification to the transmission-side communication device according to the session initiation protocol in response to the data transmission request from the transmission-side communication device and before completion of reception of the transmission data;
   at the transmission-side communication device, making a first attempt to establish the data communication for transmitting the transmission data according to a first communication mode;
   at the transmission-side communication device, making a second attempt to establish the data communication according to a second communication mode for transmitting the transmission data when the first attempt has failed; and
   at the reception-side communication device, sending a reception completion response notification according to the session initiation protocol to the transmission-side communication device at the time of the completion of reception of the transmission data performed according to the first communication mode or the second communication mode.

2. A communication system comprising:
   a transmission-side communication device; and
   a reception-side communication device,
   the transmission-side communication device and the reception-side communication device being connected via a network,
   the transmission-side communication device being configured to send a data transmission request, according to a session initiation protocol, to the reception-side communication device for transmitting transmission data to the reception side communication device;
   the reception-side communication device being configured to send a substitution notification to the transmission-side communication device according to the session initiation protocol in response to the data transmission request from the transmission-side communication device and before completion of reception of the transmission data;
   data communication being performed between the transmission-side communication device and the reception-side communication device according to a predetermined mode,
   wherein the transmission-side communication device makes an attempt to establish data communication for transmitting the transmission data with the reception-side communication device according to one of a plurality of communication modes, and
   when the attempt has failed, the transmission-side communication device makes a second attempt to establish the data communication for transmitting the transmission data with the reception-side communication device according to another communication mode,
   wherein the reception-side communication device sends a reception completion response notification, according to the session initiation protocol, to the transmission-side communication device at the time of the completion of reception of the transmission data performed according to one of the plurality of communication modes.

3. The communication system according to claim 2, wherein the transmission-side communication device makes attempts to establish the data communication according to the plurality of communication modes in order from a lowest level of an amount of data or communication processing required to a highest level of the amount of data or communication processing required.

4. The communication system according to claim 2, further comprising a server device that acts as a proxy for the data communication,
   wherein the transmission-side communication device sends a request for the data communication to the reception-side communication device via the server device,
   the reception-side communication device sends a response to the transmission-side communication device via the server device in response to the request for the data communication, and
   communication of actual data is directly performed between the transmission-side communication device and the reception-side communication device without the actual data being transmitted through the server device.

5. The communication system according to claim 4, wherein the server device acts as the proxy to perform call control in accordance with the session initiation protocol between the transmission-side communication device and the reception-side communication device.

6. The communication system according to claim 2, wherein the transmission-side communication device performs call control in accordance with the session initiation protocol, and
   the reception-side communication device performs the call control in accordance with the session initiation protocol and sends a response to the transmission-side communication device in response to the request for the data communication.

7. The communication system according to claim 2, further comprising blocking means for blocking external access to the transmission-side communication device,
   wherein the plurality of communication modes include a communication mode in which, in response to a request from the transmission-side communication device, the blocking means generates an address available to the reception-side communication device corresponding to transmission data transmitted by the transmission-side communication device, the transmission-side communication device obtains the available address corresponding to the transmission data from the blocking means and notifies the reception-side communication device of the obtained available address, and the reception-side communication device accesses the notified available address and obtains the transmission data released from the transmission-side communication device.

8. The communication system according to claim 2, wherein the plurality of communication modes includes a communication mode in which a data transmitting processor that performs data transmission stores transmission data in data storage means, a call control processor that performs call control notifies the reception-side communication device of an address available to the reception-side communication device corresponding to the data stored in the data storage means, and the reception-side communication device accesses the available address and obtains the transmission data released from the transmission-side communication device.

9. The communication system according to claim 8, further comprising blocking means for blocking external access to the transmission-side communication device, wherein the data storage means is provided outside the blocking means with respect to the transmission-side communication device.

10. The communication system according to claim 2, wherein the transmission-side communication device stores transmission data in data storage means, and deletes the transmission data stored in the data storage means when the transmission-side communication device receives the reception completion response notification.

11. A transmission-side communication device used in a communication system in which the transmission-side communication device and a reception-side communication device are connected via a network and data communication is performed between the transmission-side communication device and the reception-side communication device according to a predetermined mode, the transmission-side communication device comprising:

a call control processor that performs call control and sends a data transmission request, according to a session initiation protocol, to the reception-side communication device for transmitting transmission data to the reception side communication device;

a data transmitting processor that performs data transmission; and a control unit that controls an operation associated with data communication, wherein the control unit controls the call control processor and the data transmitting processor to make an attempt to establish data communication for transmitting the transmission data with the reception-side communication device according to one of a plurality of communication modes and, when the attempt has failed, to make another attempt to establish the data communication for transmitting the transmission data with the reception-side communication device according to another communication mode, and wherein the transmission-side communication device receives a substitution notification from the reception-side communication device according to the session initiation protocol in response to the data transmission request from the transmission-side communication device and before completion of reception of the transmission data, and receives reception completion response notification, according to the session initiation protocol, from the reception-side communication device at the time of completion of reception of the transmission data performed according to one of the plurality of communication modes.

12. The communication device according to claim 11, further comprising a data storage unit that stores transmission data, wherein the data transmitting processor stores transmission data in the data storage unit, and the call control processor obtains an address available to the reception-side communication device corresponding to the transmission data stored in the data storage unit by the data transmitting processor from blocking means for blocking external access to the communication device, and notifies the reception-side communication device of the obtained available address.

13. The communication device according to claim 11, wherein the data transmitting processor stores transmission data in data storage means, and sends an address available to the reception-side communication device corresponding to the transmission data stored in the data storage means and a data transmission request to the reception-side communication device, and upon receiving a reception completion response notification from the reception-side communication device in response to the data transmission request, the data transmitting processor deletes the transmission data stored in the data storage means.

14. The communication device according to claim 13, further comprising a data storage unit serving as the data storage means.

15. The communication device according to claim 11, wherein the call control processor performs call control in accordance with the session initiation protocol.

16. A reception-side communication device used in a communication system in which a transmission-side communication device and the reception-side communication device are connected via a network and data communication is performed between the transmission-side communication device and the reception-side communication device according to a predetermined mode, the communication device comprising:

a call control processor that performs call control and receives a data transmission request, according to a session initiation protocol, from the transmission-side communication device for transmitting transmission data to the reception side communication device;

a data receiving processor that performs data reception; and a control unit that controls an operation associated with data communication, wherein the control unit controls the call control processor to send a substitution notification to the transmission-side communication device, according to the session initiation protocol, in response to the data transmission request from the transmission-side communication device and before completion of reception of the transmission data, and send a reception completion response notification, according to the session initiation protocol, to the transmission-side communication device at the time of completion of reception of the transmission data performed according to one of the plurality of communication modes.

17. A non-transitory computer-readable storage medium which stores a program for performing data communication between a transmission-side communication device and a reception-side communication device connected via a network using a computer according to a predetermined mode, the program allowing the computer to function as the transmission-side communication device comprising:
 a call control processor that performs call control and sends a data transmission request, according to a session initiation protocol, to the reception-side communication device for transmitting transmission data to the reception side communication device;
 a data transmitting processor that performs data transmission; and
 a control unit that controls the call control processor and the data transmitting processor to make an attempt to establish data communication for transmitting the transmission data with the reception-side communication device according to a first communication mode, and, when the attempt has failed, to make another attempt to establish the data communication for transmitting the transmission data with the reception-side communication device according to a second communication mode,
 wherein the transmission-side communication device receives a substitution notification from the reception-side communication device according to the session initiation protocol in response to the data transmission request from the transmission-side communication device and before completion of reception of the transmission data, and receives reception completion response notification, according to the session initiation protocol, from the reception-side communication device at the time of completion of reception of the transmission data performed according to one of the plurality of communication modes.

18. A non-transitory computer-readable storage medium which stores a program for performing data communication between a transmission-side communication device and a reception-side communication device connected via a network using a computer according to a predetermined mode, the program allowing the computer function as the reception-side communication device comprising:
 a call control processor that performs call control and receives a data transmission request, according to a session initiation protocol, from the transmission-side communication device for transmitting transmission data to the reception side communication device;
 a data receiving processor that performs data reception; and
 a control unit that controls the call control processor to send a substitution notification to the transmission-side communication device according to the session initiation protocol in response to the data transmission request from the transmission-side communication device and before completion of reception of the transmission data, and send a reception completion response notification, according to the session initiation protocol, to the transmission-side communication device at the time of completion of reception of the transmission data performed according to one of the plurality of communication modes.

* * * * *